INVENTORS.
ROBERT ROYCE JOHNSON,
BY PAUL M. DAVIES,
Lester L. Hecht
THEIR ATTORNEY.

FIG. 1b.
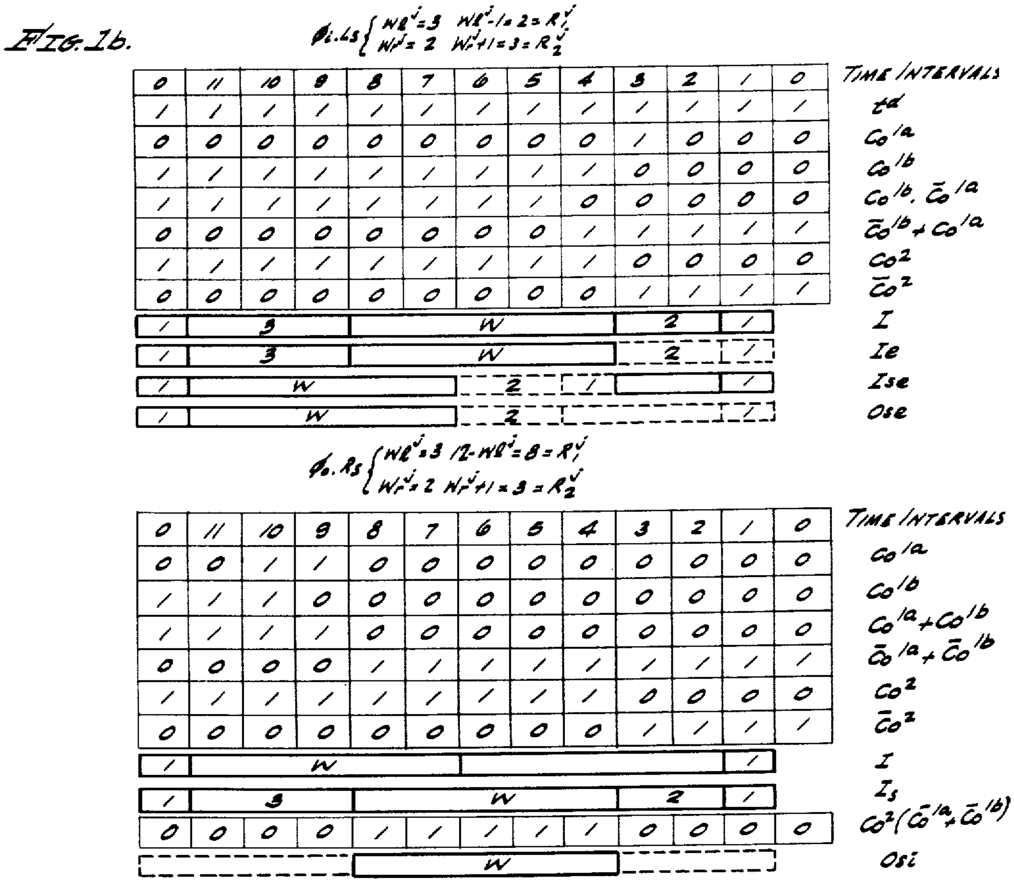
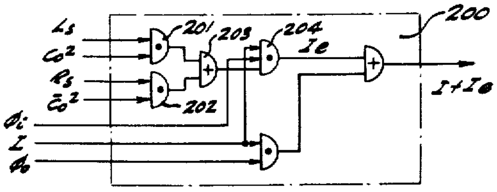
FIG. 2.
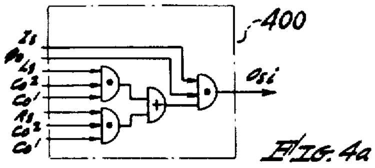
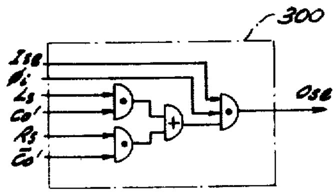
FIG. 3a.
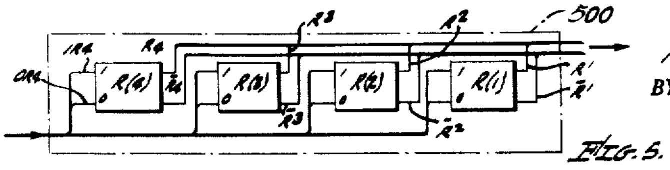
INVENTORS.
ROBERT ROYCE JOHNSON,
BY PAUL M. DAVIES,
Lester S. Hecht
THEIR ATTORNEY.

INVENTORS.
ROBERT ROYCE JOHNSON,
PAUL M. DAVIES,
BY
Lester S. Hecht
THEIR ATTORNEY.

INVENTORS.
ROBERT ROYCE JOHNSON,
BY PAUL M. DAVIES,

Lester S. Hecht
THEIR ATTORNEY.

INVENTORS.
ROBERT ROYCE JOHNSON,
PAUL M. DAVIES,
BY Lester S. Hecht
HIS ATTORNEY.

United States Patent Office 2,930,028

Patented Mar. 22, 1960

2,930,028

CIRCUITS FOR SELECTIVELY SHIFTING, EXTRACTING, AND INSERTING DIGITAL INFORMATION

Robert Royce Johnson, Pasadena, and Paul M. Davies, Santa Monica, Calif., assignors, by mesne assignments, to Hughes Aircraft Company, a corporation of Delaware Application December 7, 1953, Serial No. 396,702

23 Claims. (Cl. 340—174)

Figure 1:
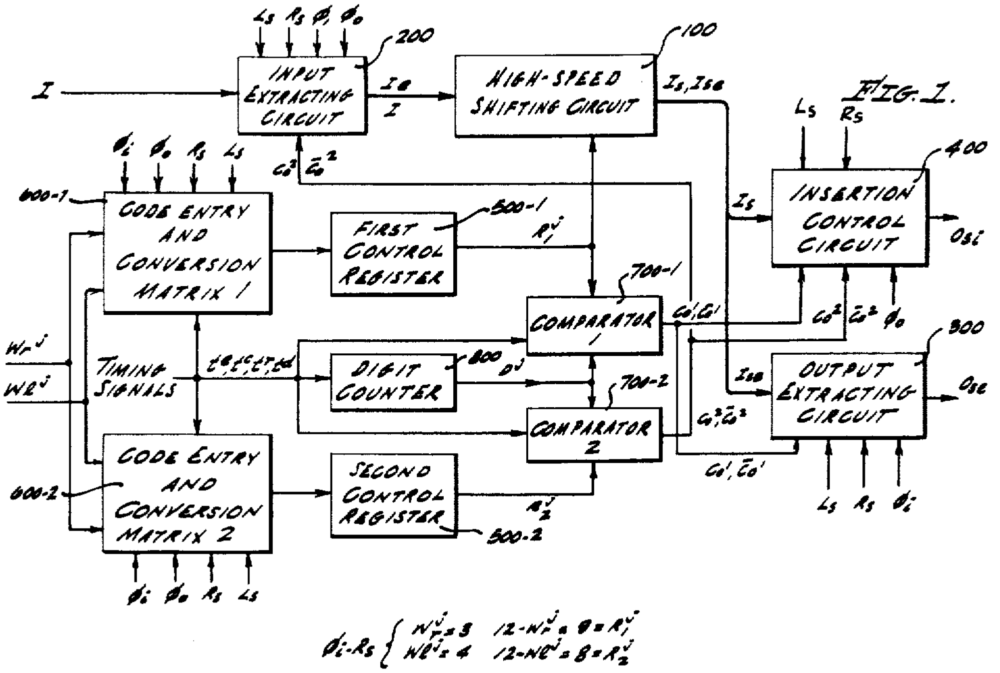

This invention relates to circuits for selectively shifting, extracting, and inserting digital information and, more particularly, to circuits which may be actuated, in accordance with a set of applied control signals: to prepare serially applied input information for a subsequent operation, by simultaneously shifting and extracting a specified series portion thereof; or to prepare a selected series of digits of an information group for entry into a predetermined position in another information group, by simultaneously shifting and inserting the selected series into the predetermined position.

Circuits for selectively shifting, extracting, and inserting, such as are disclosed by the present invention, find particular application in high-speed electronic business data handling systems wherein it is necessary to extract a portion of input information from a particular memory location and to shift the extracted portion in preparation for an arithmetic or other logical operation. Such circuits may also be utilized where it is necessary to insert the result of an arithmetic or other logical operation into a set of output data which may then constitute a new business record.

Separate shifting, extracting, and inserting circuits which may be utilized to provide this set of operations are presently known in the computing art. Serial shifting, for example, has been achieved by passing input information through a series of delay sections a number of times to provide the total shift desired.

A convenient method may be used for shifting the time position of serially applied digital data. Thus, if a series of input data is applied throughout an operating cycle or word time comprised of $n$ successive digit periods where it is assumed that the least significant digits are presented first, it is possible to obtain either a left shift or a right shift by inserting the appropriate amount of time delay. As will become apparent subsequently, a left shift represents a shift toward the positions of increased digital significance in a word, and a right shift represents a shift toward the positions of decreased digital significance in the word. When a left shift is desired, the amount of time delay inserted may be directly equal to the number of digits of the desired shift. When a right shift is desired, the number of digits of delay may be equal to ($n$—the right shift). This is equal to a delay of an entire operating cycle less the number of digits corresponding to the right shift which is desired. Since a delay of slightly less than an entire operating cycle is obtained, this causes the information to be shifted from one operating cycle to the next operating cycle in the direction of the positions of decreased significance. The amount of shift in the direction of decreased significance is equal to the difference between the number of digits ($n$) in an operating cycle and the amount of time delay provided for the cycle of operation. In view of the above, the equation for time delay can be expressed as follows: Time delay=left shift or ($n$—right shift).

Separate extracting circuits have been devised wherein extraction from an information digit series is effectively performed as the logical multiplication, digit-by-digit, of an extraction code series and the corresponding place digits of the information series. The logical multiplication operation effectively deletes information digits which are not selected, retaining a series of selected digits in places where the corresponding extraction code digit indicates such a selection is to be made. In a similar manner, insertion has been performed under the control of an insertion code series where a particular insertion digit indicates whether or not a particular information digit is to be inserted in the corresponding place.

The above-described prior art separate shifting, extracting, and inserting circuits may be utilized economically when sufficient time is available to program the preparation of selected quantities for an operation. Such a situation may arise in scientific computing systems, for example, wherein the time required to program the preparation of input quantities is relatively short in comparison with the length of computation period required. In the typical business data handling problem, however, the operation or computation time is very short, due to the simplicity of the operations which are to be performed, and consequently it is imperative to prepare quantities for operation rapidly, since otherwise a greater total time would be required for the preparation of input quantities for the various operations than for the performance of the operations. Consequently, it is desirable that business data handling systems be designed so that shifting, extracting and inserting may be performed rapidly and yet in an economical manner.

In business data handling systems, it is advantageous to use a selected portion of a particular memory location without disturbing the remaining contents of that memory location. In computers having fixed word lengths, the arithmetic operations are generally based upon the premise that each operand is shifted either to the extreme left or to the extreme right of the register before commencing operation and upon the premise that each resultant appears at the extreme left or the extreme right. Whether a particular operand or resultant appears at the left or the right depends upon which operation is being performed. Because of this, a short operand occupying only a portion of a memory location may be completely specified by identifying the address of the memory location and by also identifying in the memory location the left and right portions which are due to remain undisturbed in carrying out the particular operations. These left hand and right hand portions may be identified in this application by code sets $Wl$ and $Wr$, respectively.

Likewise, a very short resultant may be inserted into the middle portion of a memory location so as to leave undisturbed the contents of the left and right portions. This also may be accomplished by specifying the address of the memory location and by identifying the left and right portions as by code sets $Wl$ and $Wr$, respectively. In a particular case, for example, the capacity of the memory location may be 10 digits and a particular word portion 5 digits in length may be initially positioned at the right end of the register. Successive digits in the register may be presented in a direction from right to left. In the example, it may be desired to position the resultant in the memory location so as to leave undisturbed the 3 digits at the extreme left and the two digits at the extreme right. This causes the code set $Wl$ to have a value representing 3 digits and the code set $Wr$ to have a value representing 2 digits. As will be described in detail subsequently in this application, the particular word portion would be shifted to the left by 2 digits in accordance with the code set $Wr$ and would then be inserted into the memory location.

Certain control circuits are necessary in order to accomplish such a system for its intended purpose of reducing the time required in transferring information to and from the memory both before and after arithmetical operations. These control circuits should include means for generating binary signals $\phi i$ and $\phi o$. The binary signal $\phi i$ may have a binary value representing "1" during input phases when information is being transferred from the memory to the arithmetic unit. The binary signal $\phi o$ may have a binary value representing "1" during the time that information is being transferred from the arithmetic unit back to the memory. The control circuits should also include means for generating a signal indicating that a left shift is to be performed or that a right shift is to be performed. Such a control circuit would be responsive to certain instructions which will be described in detail subsequently.

This invention, therefore, provides a circuit which operates on a serial basis to shift, extract and insert information from a memory member for use in various types of data processing systems. An amount of time delay is provided depending upon the values of $Wl$ and $Wr$. The amount of time delay also depends upon whether the operating period is an input phase $\phi i$ or an output phase $\phi o$ and upon whether a left shift or a right shift has been specified. In addition to providing the proper amount of time delay or shift, the present invention effectively deletes portions of the information during successive operations. During an input phase $\phi i$, for example, an undesired portion of the word may be initially deleted during the first operating cycle at the same time that the remaining portion of the word is being shifted. After the shifting operation has been completed, the remaining undesired portion of the word may be deleted in a second operating cycle.

The present invention provides a high-speed electronic circuit for simultaneously shifting and extracting or simultaneously shifting and inserting, and is particularly designed for use in a business data handling system. The present invention uses code selection sets $Wr^j$ and $Wl^j$ which define the boundaries of the portion W of a word to be shifted and to be retained after the shifting operation. According to the present invention code selection sets $Wr^j$ and $Wl^j$, where $j$ indicates the digital position of each binary digit within the code selection set, are entered into separate control registers and then converted to control signal sets $R_1^j$ and $R_2^j$ in a manner making it possible to obtain all of the shifting and extracting or shifting and inserting signals which are required. The control signal sets $R_1^j$ and $R_2^j$ are continuously compared in first and second comparator circuits with the signal sets of a digit counter providing a series of code sets indicating an absolute time reference. The comparison signals are then utilized to define extraction or insertion code series required for a logical multiplication operation for deleting nonselected information digits; the signal set $R_1^j$ being utilized simultaneously to control the shifting operation.

The essence of the invention lies in the technique of converting signals $Wr^j$ and $Wl^j$ to sets $R_1^j$ and $R_2^j$ in a manner making it possible to obtain all of the shifting, extracting, and inserting information required with a minimum of logical gating elements and flip-flops. This conversion effectively results in the definition of a circuit wherein only two flip-flop control registers are required, whereas separate shift, extract, and insert circuits would require at least three flip-flop control registers.

Accordingly it is an object of the present invention to provide a circuit for shifting, extracting, and inserting digital information in accordance with a set of applied control signal sets, by simultaneously shifting and extracting a selected series of information digits or by simultaneously shifting and inserting a selected series of information digits.

Another object is to provide a high-speed shifting, extracting, and inserting circuit which may be utilized efficiently in an electronic business data handling system for rapidly preparing input information for operation and for inserting results of operations into output data sets.

A further object is to provide a circuit for selectively shifting and extracting or shifting and inserting selected series of information digits in accordance with right-hand and left-hand code selection sets specifying information digits to be deleted or nonselected.

Still another object is to provide an electronic shifting and extracting or shifting and inserting circuit wherein code sets $Wr^j$ and $Wl^j$ are utilized to indicate the information digits to the right and left, respectively, of an information series W, which is to be selected for extraction or insertion, the selected series W being in an information group of a fixed length $n$.

Yet a further object is to provide an economical shift-extract or shift-insert circuit which may be utilized efficiently in a high-speed business data handling system wherein selections for extraction or insertion are specified according to right-hand and left-hand code selection sets; the code selection sets being converted to control signal sets in a manner making it possible to obtain control signals for any of the operations of shift, extract, or insert with a minimum of logical gating elements and flip-flops.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1A:
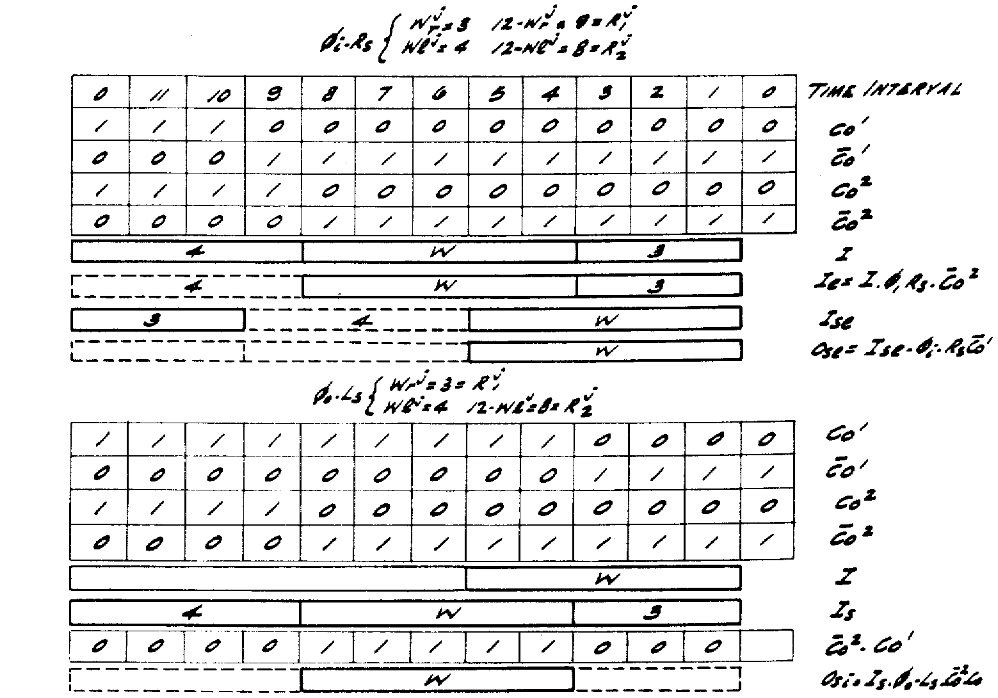
Figure 3B:
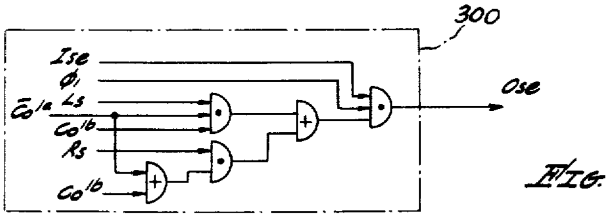
Figure 4B:
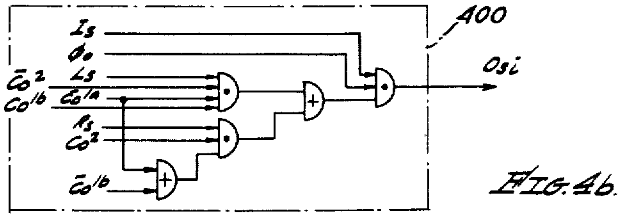
Figure 7A:
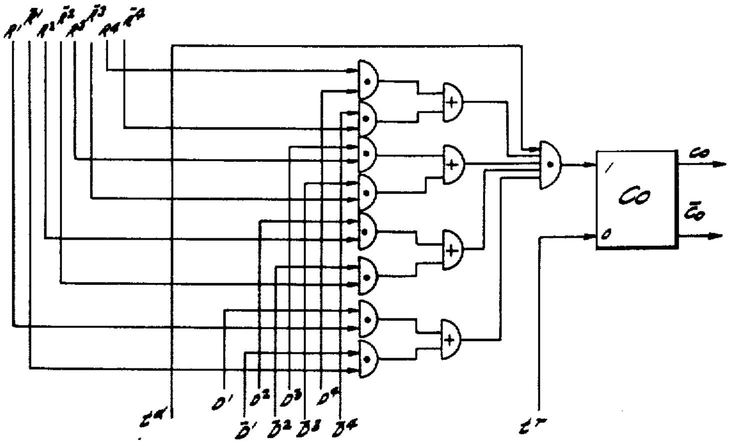
Figure 7B:
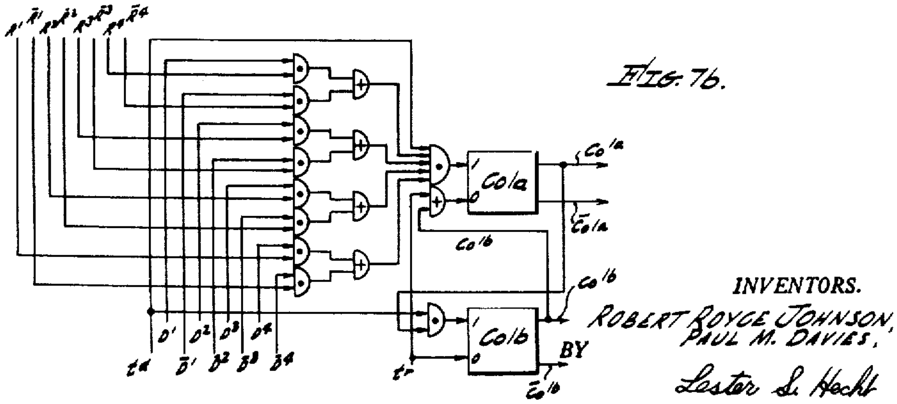
Figure 6A:
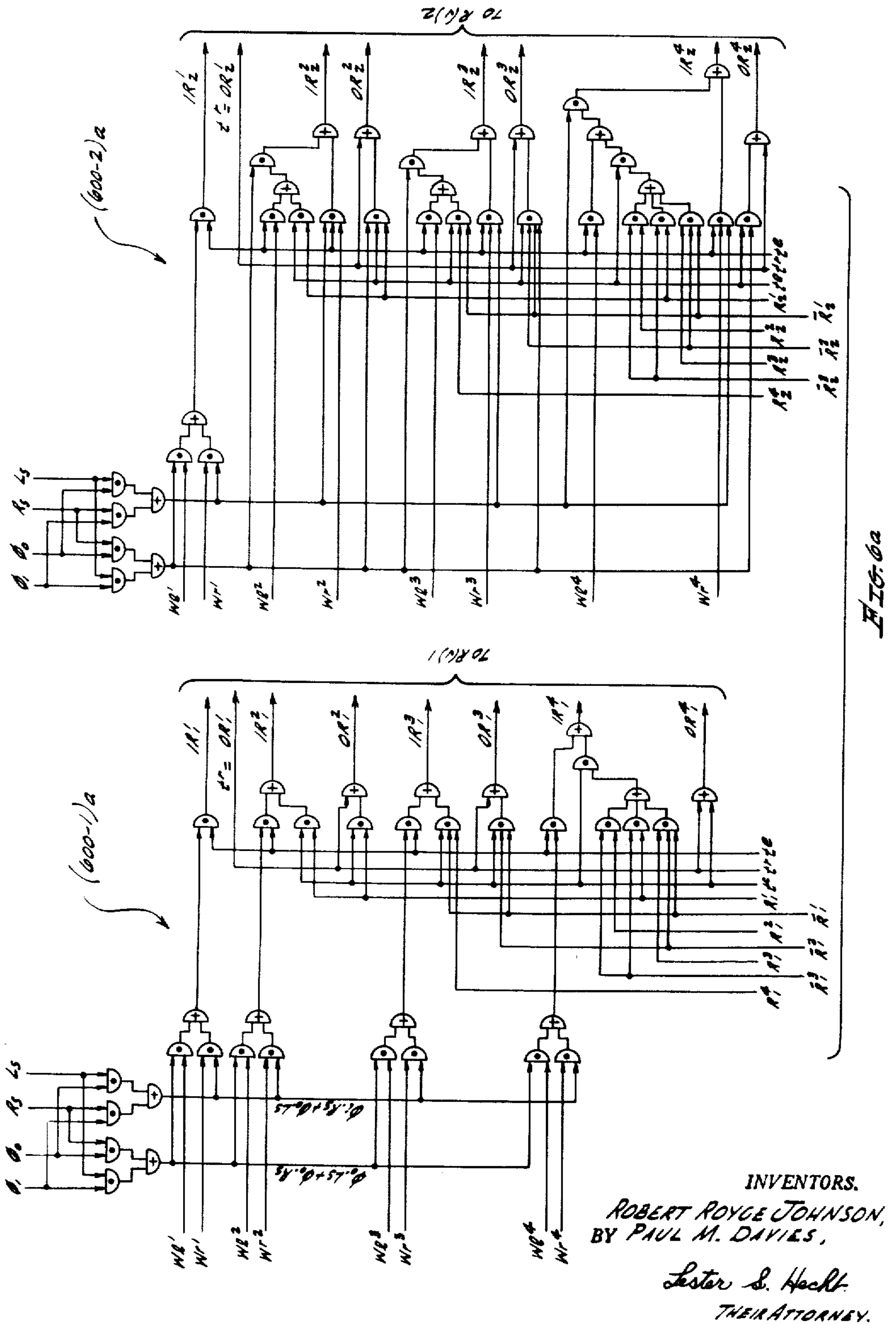
Figure 6B:
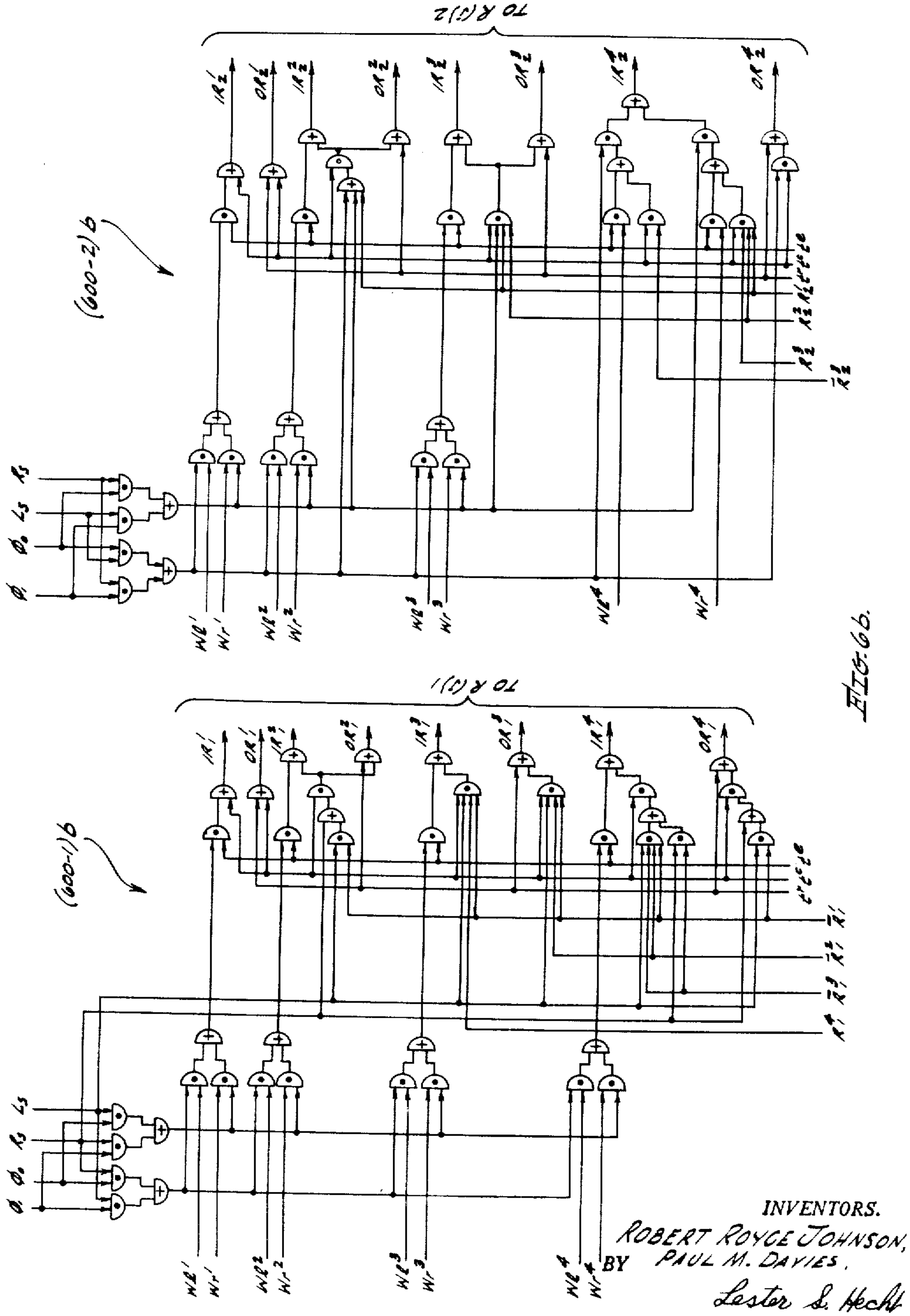

Fig. 1 is a block diagram of the basic embodiment of the present invention;

Figs. 1*a* and 1*b* respectively illustrate the operation of two embodiments of the invention;

Fig. 2 illustrates a schematic diagram of a suitable form of input and extracting circuit 200 shown in Fig. 1;

Figs. 3*a* and 3*b* illustrate suitable forms for extraction circuit 300 of Fig. 1;

Figs. 4*a* and 4*b* illustrate suitable forms for insertion circuit 400 of Fig. 1;

Fig. 5 illustrates a suitable form for registers 500 of Fig. 1;

Figs. 6*a* and 6*b* illustrate suitable forms for matrices 600 of Fig. 1; and Figs. 7*a* and 7*b* illustrate suitable forms for comparators 700 of Fig. 1.

Reference is now made to Fig. 1 wherein there is shown one embodiment of shifting, extracting, and inserting circuit according to the present invention. As shown in Fig. 1 the shifting, extracting, and inserting circuit comprises an input extracting circuit 200 responsive to applied input information signal series I (representing any of the digits in a series $I_1 \ldots I_n$) for producing a partially extracted series $Ie$ during input phases indicated by an applied control signal $\phi i$ and for passing signal series I without extraction during output phases (insertions) indicated by an applied control signal $\phi o$. Control signals $Rs$ and $Ls$, respectively indicating that right and left shifts are to be performed, are also applied to circuit 200. As will be seen, the signal series I represent the input series and the signal series $Ie$ represent the signal series during input phase $\phi i$ after a portion has been deleted by the extracting circuit 200. Furthermore, the output phase $\phi o$ can be considered as a period of insertion since the information is inserted into the memory member from an arithmetic unit.

Partially extracted signal series $Ie$ or series I are applied to a high-speed shifting circuit 100 which produces corresponding shifted output signals $Ise$ or $Is$, the amount of shift being specified by the code set $Wr^j$ or $Wl^j$, depending upon whether it is an input phase $\phi i$ or an output phase $\phi o$, and whether right shift (R$s$) or left shift (L$s$) is to be performed. The signal series I$se$ is applied to output extracting circuit 300 wherein the extraction operation is completed producing output signal series O$se$; and series I$s$ is applied to inserting circuit 400 wherein a portion of series I$s$ is inserted into an output data set in accordance with code sets W$r^j$ and W$l^j$.

All shift, extraction, or insertion operations are completely specified by two converted code sets $R_1^j$ and $R_2^j$ which are formed and entered, through code entry and conversion matrices 600–1 and 600–2, respectively, into control registers 500–1 and 500–2. Code conversion matrices 600 form sets $R_1^j$ and $R_2^j$ as a function of applied code sets W$r^j$ and W$l^j$, in response to phase and shift indicating control signals $\phi i$, $\phi o$, R$s$, and L$s$.

Converted control set $R_1^j$ is utilized to specify directly the amount of time delay which is to be provided by shifting circuit 100 and is also compared with the digit time code reference sets $D^j$ produced by a counter 800; the comparison being made in a first comparator circuit 700–1 producing complementary signal sets $Co^1$ and $\overline{Co^1}$. The signals $Co^1$ and $\overline{Co^1}$ provide information utilized in extraction and insertion. A similar comparison is made between signal sets $D^j$ and set $R_2^j$ in a second comparator circuit 700–2 which produces signals $Co^2$ and $\overline{Co^2}$ providing information required to complete the specification of extraction and insertion operations.

Since shifting circuit 100 and digit counter 800 are not novel with the present invention, they are not considered in detail herein; reference is made, therefore, to copending U.S. patent application Serial No. 327,567, for "Binary-Coded Flip-Flop Counters," by E. C. Nelson, filed December 23, 1952, wherein suitable types of counters are described. Copending application Serial No. 327,567 has now issued into Patent 2,816,223.

Input and output extracting circuits 200 and 300, inserting circuit 400, control registers 500, matrices 600, and comparators 700 are illustrated in exemplary forms in Figs. 2; 3*a*, 3*b*; 4*a*, 4*b*; 5; 6*a*, 6*b*; and 7*a*, 7*b*; respectively. Since the mechanization of these circuits is determined according to logical equations which define the respective operations of the circuits, it is considered necessary, as a preliminary discussion of the invention, to first formulate the basic principles involved. Accordingly, the discussion immediately following relates to the general logical operation of the invention, rather than to specific circuits.

As will become more apparent subsequently, the code selection sets W$l^j$ and W$r^j$ respectively indicate the amount of left shift or right shift to be performed during the input phases $\phi i$ of an arithmetic operation. During the output phases $\phi o$, the selected information series W is effectively shifted back and inserted into an output position. Consequently, the code sets W$l^j$ and W$r^j$ indicate the reverse situation, that is, the amount of right shift or left shift, respectively. The general sequence of operation required is indicated in Table I, below, wherein four situations are considered, namely: left and right shift during input phase $\phi i$; and left and right shift during output phase $\phi o$.

As indicated in Table I below, a word length, corresponding to the fixed capacity of each individual memory location, is $n$ digits. The symbol W indicates either a short operand which is less than a word length, or a short resultant which is less than a word length. Symbols W$l^j$ and W$r^j$ are utilized to indicate respectively left-hand and right-hand portions of the memory locations which are to remain unused. Thus, a particular memory location holds one word or $n$ digits of information, including an information group W$l^j$, a group W, and a group W$r^j$.

During input phase $\phi i$ a short operand W which initially reposes in a middle portion of a memory location is to be extracted therefrom and simultaneously shifted either to an extreme right-hand position or to an extreme left-hand position. Table I therefore illustrates the two situations $\phi i.Ls$ for left shift, and $\phi i.Rs$ for right shift. During the output phase $\phi o$ a short resultant W which is positioned at either the extreme right end or at the extreme left end of the register is to be shifted to the middle portion thereof. Thus, the two possible operations involved may be designated as $\phi o.Ls$ for left shift, and $\phi o.Rs$ for right shift.

As will be seen from the subsequent discussion, the present invention contemplates a serial system. Thus, in accordance with the present invention time delay is achieved either by reading the selected series out during the same word time after a number of digits of delay equal to the desired amount of left shift, or by reading the selected series out during the next succeeding word time after a number of digits of delay corresponding to $n$ minus the desired amount of right shift. During input phase $\phi i$, information is read out of the memory member during the transfer of the information from a memory member to an arithmetic unit. During output phase $\phi o$, information is read out from an arithmetic unit during the transfer of the information from the arithmetic unit to the memory member.

*Table I*

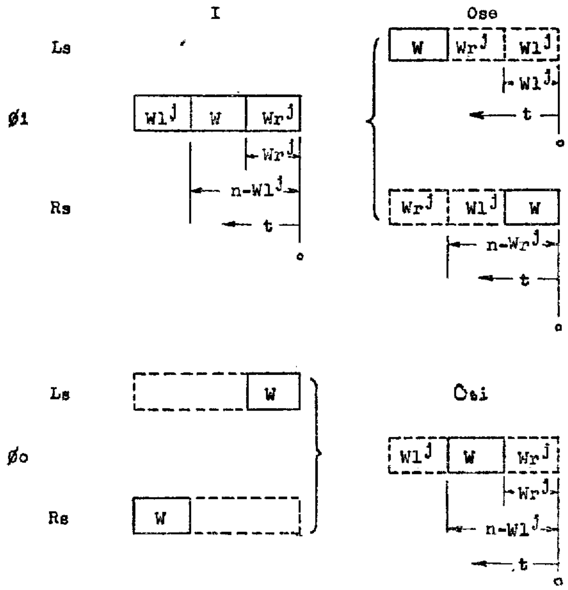

As indicated in Table I, during input phase $\phi i$ the selected series W is shifted to the left by W$l^j$ digits or to the right by W$r^j$ digits and then the nonselected digit portions, indicated as dotted line sections, are deleted. During left shift (L$s$) the nonselected portion W$r^j$ may be deleted in input extracting circuit 200 during the time interval $0 \leq t \leq Wl^j$ of the second word time. During right shift (R$s$) the portion W$l^j$ is deleted in input circuit 200 during time interval $n \geq t \geq n - Wl^j$ of the first word time, and the portion W$r^j$ is deleted in the output circuit 300 during the time interval $n \geq t \geq n - Wr^j$ of the second word time. During output phase $\phi o$ nonselections are effectively performed by inhibiting the insertion of information digits in insertion circuit 400, insertion being inhibited during the time intervals $0 \leq t \leq Wr^j$ and $n \geq t \geq n - Wl^j$. For simplicity the time boundaries 0 and $n$ will be omitted in the discussion which follows.

With these basic relationships, then, the selected signal series I$e$, O$se$, and O$si$ may be defined as follows:

$$Ie = I.\phi i.[Ls.(t \geq Wr^j) + Rs.(t \leq n - Wl^j)]$$
$$Ose = Ise.\phi i.[Ls.(t \geq Wl^j) + Rs.(t \leq n - Wr^j)]$$
$$Osi = Is.\phi o.[(t \geq Wr^j).(t \leq n - Wl^j)]$$

where the dot (.) represents the logical "and" and the plus (+) the logical inclusive "or." The function defining the partially extracted signal series I$e$ indicates that this signal series corresponds to the series I during phase $\phi i$ if a left shift is performed and $t \geqq Wr^j$ ($t \leqq Wr^j$ being deleted); or if a right shift is performed and $t \leqq n-Wl^j$ ($t \geqq n-Wl^j$ being deleted). In a similar manner signal series $Ose$ corresponds to the partially shifted and extracted series $Ise$ during phase $\phi i$, if a left shift is performed and $t \leqq n-Wr^j$; and series $Ose$ corresponds to shifted input series $Is$ during phase $\phi o$ during the time interval $t \geqq Wr^j$ and $t \leqq n-Wl^j$. As will be seen, the term $Ie$ represents the portion of the word which has passed through the circuit 200 without being deleted by that circuit. For example, during a left shift operation for input phase $\phi i$, the portions W and $Wl^j$ of greatest significance pass through the circuit 200 and the least significant portion $Wr^j$ becomes deleted. This is indicated by the equation $Ie = I.\phi i.Ls.t \geqq Wr^j$. Similarly, during a right shift operation, the portions $Wr^j$ and W of least significance are passed by the circuit 200 and the portion $Wl^j$ of greatest significance becomes deleted by the circuit 200. This is indicated by the term $$Ie = I.\phi i.Rs.t \leqq (n-Wl^j)$$

Just as the term $Ie$ represents the portion of a word passing through the circuit 200 during input phase $\phi i$, the term $Ose$ represents the portion of the word passing through the control circuit 300. The portion passing through the control circuit is obtained by initially shifting the portion of the word passing through the circuit 200. The shifting is provided by the circuit 100.

By way of illustration, the portions W and $W^j$ passing through the circuit 200 for a $\phi i.Ls$ operation are shifted so that the portion W is moved to the position of greatest digital significance and the portion $W^j$ is shifted to the positions of least digital significance. The portion $Wl^j$ is then deleted by the circuit 300 so that only the portion W in the digits of greatest significance remains. This is indicated by the equation $Ose = Ise.\phi i.Ls.t \geqq Wl^j$. In this equation, $Ise$ indicates that the word portion passed by the circuit 200 has been shifted in position by the circuit 100.

For a $\phi i.Rs$ operation, the portions $Wr^j$ and W passing through the circuit 200 are shifted in phase by the circuit 100 so that the portion $Wr^j$ is moved to the positions of greatest significance in the word and the portion W is moved to the positions of least significance. The portion of the word in the positions of least significance is then passed by the control circuit 300, and the portion of the word in the positions of greatest significance is deleted by the circuit 300. This is indicated by the equation $Ose = Ise.\phi i.Rs.(t \leqq n-Wr^j)$.

During an output phase operation represented by $\phi o$, the portion of the word in the positions of least digital significance is shifted to the middle portion of the word for a left shift operation. Similarly, for a right shift operation, the portion W of the word in the positions of greatest digital significance is shifted to the middle portion of the word. The shifting operation is obtained by the circuit 100 so as to produce the signals $Is$. Since only the portion W occurs in the word, no deletion is performed by the circuit 200 for a $\phi o$ operation. After the shifting operation, the portion W occurs only in the middle positions of the word. These middle positions are defined by $(t \geqq Wr^j).(t \leqq n-Wl^j)$. Because of this, the extracting circuit 400 becomes activated during the middle positions of a word to pass the portion W as indicated by the equation $$Osi = Is.\phi o.[(t \geqq Wr^j).(t \leqq n-Wl^j)]$$

One preferred method of controlling right shift operation is to perform an $n$'s complement for right shift operations. Thus, during $\phi i.Rs$ operations, a conversion $n-Wr^j$ is performed and during $\phi o.Rs$, the conversion $n-Wl^j$ is performed. These operations may be seen from Table I above. As indicated in Table I, the portion W of a word is shifted from positions of intermediate digital significance to positions of least digital significance when a conversion $(n-Wl^j)$ is produced during a $\phi i.Rs$ operation. Similarly, the portion W of a word is shifted from positions of greatest digital significance to positions of intermediate digital significance by providing a conversion of $(n-Wl^j)$ during a $\phi o.Rs$ operation. Thus, the signals $R_1^j$ produced by register 500–1 represent the code sets $Wl^j$, $n-Wr^j$, $Wr^j$, and $n-Wl^j$ during operations $\phi i.Ls$, $\phi i.Rs$, $\phi o.Ls$, and $\phi o.Rs$, respectively; these quantities being directly equal to the respective time delays which are desired.

The control register signals $R_1^j$ and $R_2^j$ may now be defined in a manner making it possible to obtain all of the shift, extract, and insert functions required to perform the above-indicated operations, the definitions being presented in Table II below:

*Table II*

| | Extract-Insert Functions | | Shift Functions | Register Signals | | Comparison Signals | |
|---|---|---|---|---|---|---|---|
| | | | | $R_2^j$ | $R_1^j$ | $Co^2$ $(D^i=R_2^j)$ | $Co^1$ $(D^i=R_1^j)$ |
| $\phi i$ Ls | $(t \geq Wr^j)$ | $(t \geq Wl^j)$ | $Wl^j$ | $Wr^j$ | $Wl^j$ | $Co^2=1$ | $Co^1=1$ |
| $\phi i$ Rs | $(t \leq n-Wl^j)$ | $(t \leq n-Wr^j)$ | $n-Wr^j$ | $n-Wl^j$ | $n-Wr^j$ | $\overline{Co^2}=1$ | $\overline{Co^1}=1$ |
| $\phi o$ Ls | $(t \leq n-Wl^j)$ | $(t \geq Wr^j)$ | $Wr^j$ | $n-Wl^j$ | $Wr^j$ | $\overline{Co^2}=1$ | $Co^1=1$ |
| $\phi o$ Rs | $(t \geq Wr^j)$ | $(t \leq n-Wl^j)$ | $n-Wl^j$ | $Wr^j$ | $n-Wl^j$ | $Co^2=1$ | $\overline{Co^1}=1$ |

The relationships set forth in Table II may be seen from the following discussion. For example, the "Extract-insert functions" set forth in the second vertical column represent the operation of the circuits 200, 300 and 400 in Figure 1. The "Extract-insert functions" actually have two sub-columns in Table II. The second of these two sub-columns represents the operation of the circuit 200, especially for the input phase $\phi i$. The first of the two sub-columns represents the operation of the circuit 300 for the input phase $\phi i$ and represents the operation of the circuit 400 for the output phase $\phi o$. The column designated as "Shift functions" in Table II represents the operation of the shifting circuit 100. As will be seen, two sub-columns are provided for the column designated as "Register signals." The first sub-column is designated as "$R_2^j$" to indicate the operation of the control register 500–2 in Figure 1 in controlling the operation of other stages such as the comparator 700–2 in Figure 1.

As will be seen, each designation under the sub-column "$R_2^j$" corresponds to the designation in the first one of the two sub-columns designated "Extract-insert functions." The reason for this will become apparent from the subsequent discussion.

The second sub-column under "Register signals" in Table II is designated as $R_1^j$ to indicate the operation of the control register 500–1 in Figure 1 in controlling the operation of other stages such as the comparator 700–1. As will be seen, each designation under the subcolumn $R_1^j$ corresponds to a similar designation under the "Shift functions" column and also corresponds to the second one of the two sub-columns designated "Extract-insert functions." The reason for this will become apparent from the subsequent discussion.

The last column in Table II is designated as "Comparison signals" and is provided with two sub-columns respectively designated as "$Co^2$" and "$Co^1$." The sub-column designated as "$Co$" represents a comparison between the successive digital positions in a word and the positions represented by $R_2^j$. For example, for a $\phi i.Ls$ operation, an output signal $Co^2$ is produced to indicate that an identity is obtained in comparing $Wr^j$ and the positions of least significance in the word. For a $\phi i.Rs$ operation, however, an identity is obtained for the last positions in the word corresponding to the positions designated as $Wl^j$. This causes a lack of identity to be obtained in the first positions of the word designated as $(n-Wl^j)$ such that $\overline{Co}^2=1$.

Just as the sub-column $Co^2$ represents a comparison between the successive time signals in a word and the signals designated as $R_2^j$, the sub-column $Co^1$ represents a comparison between the successive positions in a word and the signals designated as $R_1^j$. A true indentity is obtained when the signals $R_1^j$ are represented by $Wl^j$ and $Wr^j$. False signals $\overline{Co}^1$ representing a lack of identity are obtained when $R_1^j$ has a value of $(n-Wr^j)$ or $(n-Wl^j)$. This results from the fact that a true identity in the comparison is obtained when the digit positions correspond to $Wl^j$ or $Wr^j$.

The extract-insert functions of Table II have been arranged so that the shift control signals $R_1^j$ correspond also to certain of extract-insert functions, the remaining functions necessary being provided by control signals $R_2^j$. The signals $R_1^j$ and $R_2^j$ are then converted to selection-indicating time sequences by comparing them in comparator circuits 700–1 and 700–2, respectively, with the time reference code sets $D^j$. The signal $Co^1$ then indicates the time interval $t=D^j\geq R_1^j$, and the signal $Co^2$ indicates the time interval $t=D^j\geq R_2^j$. In a similar manner, the complementary comparison signals $\overline{Co}^1$ and $\overline{Co}^2$ indicate the time interval $t=D^j\leqslant R_1^j$, and $t=D^j\leqslant R_2^j$. The selected signal series $Ie$, $Ose$, and $Osi$ may now be defined in terms of the comparison signals in the following manner:

$$(200)\quad Ie=I.\phi i.[Ls.Co^2+Rs.\overline{Co}^2]$$
$$I+Ie=Ie+I.\phi o$$
$$(300)a\quad Ose=Ise.\phi i.[Ls.Co^1+Rs.\overline{Co}^1]$$
$$(400)a\quad Osi=Is.\phi o.[Ls.\overline{Co}^2.Co^1+Rs.Co^2.\overline{Co}^1]$$

Equations 200, 300*a*, and 400*a* defining suitable mechanizations of circuits 200, 300, and 400, respectively. The letter *a* indicates that other mechanization forms are considered herein.

Equation 200 is obtained from the first equation after Table I by providing appropriate substitutions from the columns of Table II. As will be seen in Table II, for example, a true signal designated as $Co^2$ is obtained from the comparator 700–2 for introduction to the circuit 300 only in the positions after $Wr^j$ when a left shift $Ls$ is specified during an input phase $\phi i$. In this way, the term "$Co^2$" can be substituted in Equation 200 for the term $t\geq Wr^j$. In like manner, a false signal designated as $\overline{Co}^2$ is produced by the comparator 700–2 for introduction to the circuit 400 when $R_2^j$ is less than $n-Wl^j$. In this way, $Co^2$ can be substituted in Equation 200 for $t\leq n-Wl^j$.

The Equation 300*a* representing $Ose$ is obtained in a manner similar to that described in the previous paragraph by appropriate substitutions of $Co^1$ and $\overline{Co}^1$ from Table II for the second equation after Table I. Equation 400*a* for $Osi$ is also obtained in a similar manner by appropriate substitutions from Table II for the third equation after Table I. As will be seen, an "or" representation formed in Equation 400*a* from two "and" propositions represents $(t\geq Wr^j).(t\leq n-Wl^j)$. This may be seen from Table II. For example, the term $\overline{Co}^2.Co^1$ represents $(t\geq Wr^j).(t\leq n-l^j)$ in Table II during a left shift operation ($Ls$) in an output phase $\phi o$. This may be seen by substituting the values under the column designated as "Comparison signals" in Table II for the appropriate values in the column designated as "Register signals" in the table. In like manner, $Co^2.\overline{Co}^1$ represents a right shift operation ($Rs$) in an output phase $\phi o$.

The expression $I+Ie=Ie+I.\phi$ in Equation 200 can be simplified to $I=I.\phi o$ by cancelling $Ie$ from both sides of the equation. The equation $I=I.\phi o$ indicates that the circuit 200 passes the signals introduced to it during the output phase $\phi o$ without extracting any of the signals. This has been indicated previously.

It will be noted that the signal set $R_1^j$ is a function of set $Wl^j$ during the operations $\phi i.Ls$ or $\phi o.Rs$ and is a function of set $Wr^j$ during $\phi i.Rs$ or $\phi o.Ls$. The $n$'s complement is then to be performed for right shift operations. Thus, the desired signals $R_1^j$ may be obtained by first entering sets $Wr^j$ or $Wl^j$ during the appropriate operation and then forming the $n$'s complement. This transition is indicated by the logical function:

$$R_1^j=Te.[Wl^j.(\phi i.Ls+\phi o.Rs)+Wr^j.(\phi i.Rs+\phi o.Ls)]+Tc.Rs.(n-X^j)$$

where $Te$ and $Tc$ respectively represent time intervals following entry and conversion. The equation for $R_1^j$ set forth immediately above is obtained from Table I. During a first time interval designated as $Te$, a plurality of flip-flops are set to a value of $Wl^j$ for either a $\phi i.Ls$ operation or a $\phi o.Rs$ operation and are set to $Wr^j$ for a $\phi i.Rs$ operation or $\phi o.Ls$ operation. As will be seen from Table II, the flip-flops representing $R_1^j$ are set to the proper state at time $Te$ for a $\phi i.Ls$ operation and for a $\phi o.Ls$ operation. However, as will be seen from Table II, a complement of $n$ has to be obtained for a $\phi i.Rs$ operation and for a $\phi o.Rs$ operation. This complementation is obtained during the time interval $Tc$ and is represented by $(n-X^j)$, where $n$ has a value equal to the number of digital positions in a word. The representation $X^j$ corresponds to that set forth in Table III and has a value of either $Wl^j$ or $Wr^j$ depending upon the type of operation being performed. This will become apparent upon a study of Table III set forth below and upon a study of the explanation for the table. As will be seen in the equation for $R_1^j$ set forth immediately above, a complementation operation is provided in a right shift operation for either an input phase $\phi i$ or an output phase $\phi o$. Since a complementation operation is being performed for both the phase $\phi i$ and the phase $\phi o$, neither $\phi i$ nor $\phi o$ is included in the representation $$Tc.Rs.(n-X^j)$$

The variable $X^j$ is utilized to represent either $Wr^j$ or $Wl^j$ which has previously been entered into the corresponding flip-flop $R(j)1$ in register 500–1. This function indicates that $R_1^j$ corresponds to $Wl^j$ during the operation $$\phi i.Ls+\phi o.Rs$$

or to $Wr^j$ during the operation $\phi i.Rs+\phi o.Ls$, during the entry period $Te$; and then corresponds to $n-Wr^j$ or $n-Wl^j$ during the conversion period $Tc$ of right shift. In a similar manner the transition to form signal set $R_2^j$ may be expressed by the logical function:

$$R_2^j=Te.[Wl^j.(\phi i.Rs+\phi o.Ls)+Wr^j.(\phi i.Ls+\phi o.Rs]+Tc.[(\phi i.Rs+\phi o.Ls).(n-X^j)]$$
$$=(\phi i.Rs+\phi o.Ls).[Te.Wl^j+Tc.(n-X^j)]+Te.Wr^j.(\phi i.Ls+\phi o.Rs)$$

The equation for $R_2^j$ set forth immediately above is obtained from Table II and specifically from the sub-column designated as $R_2^j$ in that table. During time interval $Te$, a plurality of flip-flops are set to a value of $Wl^j$ for a $\phi i.Rs$ operation or a $\phi o.Ls$ operation and are set to a value of $Wr^j$ for a $\phi i.Ls$ operation or a $\phi o.Rs$ operation. As will be seen from Table II, no further setting is to be made for the plurality of flip-flops representing $R_2^j$ for a $\phi i.Ls$ operation or a $\phi o.Rs$ operation. However, an $n$ complementation is to be obtained for a $\phi i.Rs$ operation and a $\phi o.Ls$ operation. This complementation of $n$ is provided during the time interval $Tc$. The complementation is obtained in a manner similar to that discussed below and set forth in Table III where $X^j$ represents the value before the complementation. In the complementation, a value of $(n-X^j)$ is obtained, and has a value of either $Wl^j$ or $Wr^j$ depending upon the type of operation being performed. The value of $n$ in the complementation is equal to the number of digital positions in a word.

Before considering the specific manner in which matrices 600 are mechanized to provide the conversions necessary to introduce signal sets $R_1^j$ and $R_2^j$ into registers 500–1 and 500–2, respectively, it is necessary to assume a specific code set for $Wr^j$ and $Wl^j$. As an illustration it is assumed that $n=12$ and that the code sets include four binary digits arranged in a conventional binary code. In addition it is assumed that no right shift greater than nine digits is desired. An illustrative code arrangement is shown in Table III below, wherein the set $D^j$ is also specified so that the manner of mechanization of comparators 700 will also be apparent. It will be noted that $X^j$ is utilized to represent either of the sets $Wr^j$ or $Wl^j$ and $Y^j$ or $12-X^j$ represents $R_1^j$ or $R_2^j$.

*Table III*

| | $X^j=Wr^j$ or $Wl^j$ | | | | $12-X^j=Y^j$ | | | | $D^j=t$ |
|---|---|---|---|---|---|---|---|---|---|
| | $X^4$ | $X^3$ | $X^2$ | $X^1$ | $Y^4$ | $Y^3$ | $Y^2$ | $Y^1$ | 4321 |
| (0) | 0 | 0 | 0 | 0 | 0 | 0 | 0 | 0 | 0000 0<br>0001 1 |
| (1) | 0 | 0 | 0 | 1 | 1 | 0 | 1 | 1 | 0010 2<br>0011 3 |
| (2) | 0 | 0 | 1 | 0 | 1 | 0 | 1 | 0 | 0100 4<br>0101 5 |
| (3) | 0 | 0 | 1 | 1 | 1 | 0 | 0 | 1 | 0110 6<br>0111 7 |
| (4) | 0 | 1 | 0 | 0 | 1 | 0 | 0 | 0 | 1000 8<br>1001 9 |
| (5) | 0 | 1 | 0 | 1 | 0 | 1 | 1 | 1 | 1010 10<br>1011 11 |
| (6) | 0 | 1 | 1 | 0 | 0 | 1 | 1 | 0 | 0000 12=0 |
| (7) | 0 | 1 | 1 | 1 | 0 | 1 | 0 | 1 | |
| (8) | 1 | 0 | 0 | 0 | 0 | 1 | 0 | 0 | |
| (9) | 1 | 0 | 0 | 1 | 0 | 0 | 1 | 1 | |

From Table III the $n$'s or 12's complement functions for providing the conversions $12-X^j=Y^j$ are found to be:

$$Y^1=X^1$$
$$Y^2=X^2.\bar{X}^1+\bar{X}^2.X^1$$
$$Y^3=X^3.X^2+X^3.X^1+X^4.\bar{X}^1$$
$$Y^4=\bar{X}^3.X^2+\bar{X}^3.X^1+X^3.\bar{X}^2.\bar{X}^1$$

The above equations for $Y^1$, $Y^2$, $Y^3$ and $Y^4$ may be understood from the following discussion with respect to Table III. The columns designated as $X^1$, $X^2$, $X^3$ and $X^4$ in Table III indicate a pattern of operation for four flip-flops to represent any binary form in decimal value from "0" to "9" inclusive. Although only the decimal values "0" to "9," inclusive, are shown in Table III, actually the X(1), X(2), X(3) and X(4) flip-flops provide an individual representation for any of the twelve digital positions when there are twelve digital positions in a word. As will be seen, the pattern of operation for the flip-flops X(1), X(2), X(3) and X(4) for any decimal value between "0" and "12" corresponds to the pattern of operation of the counter 800 for a corresponding digital value. The pattern of operation for the counter

800 is indicated in the last column of Table III and is represented as "$D^j$." The designation "$D^j$" indicates at any instant the number of timing signals $t^d$ introduced to the counter 800 to obtain a count of the digital positions in the word undergoing operation. Thus, a timing signal $t^d$ is provided for each digital position in the word and is counted by the counter 800.

The Y(1), Y(2), Y(3) and Y(4) flip-flops in Table III provide a complementary indication to the indication provided by the X(1), X(2), X(3) and X(4) flip-flops in the table. This indication is complementary to the decimal value of "12" since there are twelve positions in a word in the example being considered in this application. The complementary indication is provided by the Y(1), Y(2), Y(3) and Y(4) flip-flops since indications of $Wr^j$ or $Wl^j$ must be initially provided by the X(1), X(2), X(3) and X(4) flip-flops and complementary indications of $(n-Wr^j)$ or $(n-Wl^j)$ must be subsequently provided by the Y(1), Y(2), Y(3) and Y(4) flip-flops. For example, when $Wr^j$ has a decimal value of "3," the X(1), X(2), X(3) and X(4) flip-flops initially have a pattern of operation corresponding to a decimal of "3" and the Y(1), Y(2), Y(3) and Y(4) flip-flops subsequently have a pattern of operation corresponding to a decimal value of "9."

Since the Y(1), Y(2), Y(3) and Y(4) flip-flops are always triggered in a complementary pattern to the X(1), X(2), X(3) and X(4) flip-flops, logical equations can be provided to determine the relationship between the X(1), X(2), X(3) and X(4) flip-flops and the Y(1), Y(2), Y(3) and Y(4) flip-flops at any instant. For example, it will be seen from Table III that the Y(1) flip-flop always follows the pattern of the X(1) flip-flop. Because of this, $Y^1=X^1$ as indicated in the equations immediately above. Similarly, the Y(2) flip-flop becomes triggered true either for decimal values of "1," "5" or "9" or for decimal values of "2" or "6" for the X(1), X(2), X(3) and X(4) flip-flops. Decimal values of "1," "5" and "9" can be represented by the relationship $\bar{X}^2.X^1$ to distinguish from all decimal values between "0" and "12." Similarly, decimal values of "2" and "6" can be distinguished from all other decimal values up to "12" by the relationship $X^2.\bar{X}^1$.

In like manner, it will be seen that the Y(3) flip-flop is triggered true when the X(1), X(2), X(3) and X(4) flip-flops have decimal values of "5," "6," "7" and "8." Decimal values of "5" and "7" can be distinguished from all of the other decimal values up to "12" by the relationship $X^3.X^1$. Similarly, decimal values of "6" and "7" can be distinguished from all other decimal values by the relationship $X^3.X^2$ and a decimal value of "8" can be distinguished from all other decimal values by the relationship $X^4.\bar{X}^1$. This indicates how the relationship for $Y^3$ set forth immediately above is obtained. It is believed that the relationship for $Y^4$ can be determined from this discussion by a person skilled in the art.

These basic conversion functions then define the conversion which must be performed in registers 500, the general form of which is illustrated in Fig. 5. As indicated in Fig. 5, registers 500 include four flip-flops R(1), R(2), R(3), and R(4) producing complementary output signal pairs $R^1$, $\bar{R}^1$; $R^2$, $\bar{R}^2$; $R^3$, $\bar{R}^3$; and $R^4$, $\bar{R}^4$ and having 1 and 0 input circuit pairs 1R1, 0R1; 1R2, 0R2; 1R3, 0R3; and 1R4, 0R4, respectively. The flip-flops are conventional circuits having input circuits such that the separate application of pulses to the 1 and 0 input circuits of a flip-flop sets the flip-flop to 1 or 0 representing stable states and the simultaneous application of pulses to both input circuits triggers the flip-flop or changes its stable state.

Since the signal set $X^j$, representing either $Wr^j$ or $Wl^j$ is entered into flip-flops $R(j)$ prior to the conversion operation which forms the set $12-X^j=Y^j$, a simpler conversion function set may be obtained because of the flip-flop characteristics. These functions may be expressed as follows:

$$1R1=0R1=0$$
$$1R2=0R2=R^1$$
$$1R3=R^4.\bar{R}^1$$
$$0R3=\bar{R}^2.\bar{R}^1$$
$$1R4=\bar{R}^3.R^2+\bar{R}^3.R^1+R^3.\bar{R}^2.\bar{R}^1$$
$$0R4=1$$

The equations set forth immediately above indicate a simplified arrangement whereby one set of flip-flops may be used to perform the functions of both the flip-flops X(1), X(2), X(3) and X(4) and the flip-flops Y(1), Y(2), Y(3) and Y(4) in Table III. The one set of flip-flops may be designated as R(1), R(2), R(3) and R(4) and are initially triggered to a pattern of operation corresponding to that of the flip-flops X(1), X(2), X(3) and X(4) in Table III. The R(1), R(2), R(3) and R(4) flip-flops are subsequently triggered to a pattern of operation corresponding to that of the Y(1), Y(2), Y(3) and Y(4) flip-flops in Table III. The equations set forth immediately above indicate simplified logical relationships controlling the triggering of the R(1), R(2), R(3) and R(4) flip-flops from a pattern of operation corresponding to that of the X(1), X(2), X(3) and X(4) flip-flops to a pattern of operation corresponding to that of the Y(1), Y(2), Y(3) and Y(4) flip-flops.

As will be seen from Table III, the Y(1) flip-flop corresponds at all times to the pattern of operation of the X(1) flip-flop. Because of this, the R(1) flip-flop does not have to be triggered in order to indicate an operation of the Y(1) flip-flop as compared to the operation of the X(1) flip-flop. This is indicated by the equations $1R1=0R1=0$. The equation for 1R2 is obtained from the equation set forth above for $Y^2$ by a simplification of terms. For example, since the R(2) flip-flop is already triggered true when the relationship $X^2.\bar{X}^1$ exists, no further triggering has to be provided for the R(2) flip-flop. This causes the relationship $X^2.\bar{X}^1$ to be superfluous. Similarly, the term $\bar{X}^2.X^1$ can be simplified to $X^1$ since $X^1$ indicates that the R(2) flip-flop has to be triggered true in order to obtain a value corresponding to $Y^2$ from a value corresponding to $\bar{X}^2$. This results in the equations $1R2=0R2=R^1$.

The relationships $X^3.X^2$ and $X^3.X^1$ can be deleted in the equation for 1R3 since the R(3) flip-flop is already true when these relationships exist. This causes the equation for 1R3 to be simplified to $1R3=R^4.\bar{R}^1$. A comparison of $X^3$ and $Y^3$ in Table III indicates that the Y(3) flip-flop has to be triggered from a true state to a false state only for a decimal value of "4" for the X(1), X(2), X(3) and X(4) flip-flops. Since this can be represented by the relationship $\bar{X}^2.\bar{X}^1$ $0R3=\bar{X}^2.\bar{X}^1$. It is believed that the equations for 1R4 and 0R4 can be deduced by a person skilled in the art from the above discussions.

Since the manner of providing flip-flop functions has been presented on frequent occasions in numerous copending applications, it is not considered necessary for the purpose of describing this invention to include a discussion of this general technique herein. Reference is made to the following U.S. patent applications: (1) Serial No. 327,131, for "Binary Coded Flip-Flop Counters" by Robert R. Johnson, filed December 20, 1952, now Patent No. 2,853,238; (2) Serial No. 378,307, for "Result-From-Carry Adder-Subtractors" by John V. Blankenbaker, filed September 3, 1953, now Patent No. 2,892,587; and (3) Serial No. 378,116, for "Multiple Input Binary-Coded Decimal Adders and Subtracters" by J. V. Blankenbaker, filed September 2, 1953; wherein the general theory of flip-flop conversion functions is considered. All of these patent applications have been assigned of record to the assignee of record of this patent application.

The manner in which these functions operate to provide the desired conversions may be demonstrated by considering the code transition shown in Table III. The conversion for flip-flop R(1) indicates that once having entered the signal $X^1$ into this flip-flop no further change need be made to form $Y^1$. The signal $Y^2$ is obtained from the signal $X^2$ registered in flip-flop R(2) by triggering this flip-flop if $X^1$ is 1, $X^1$ being represented by signal $R^1$ after the entry into register 500. The significance of the other conversions may be determined through a similar analysis.

Two sets of flip-flop entry and conversion functions may now be specified, defining the mechanization of matrices 600–1 and 600–2 as follows:

$$(600\text{-}1)a\begin{cases}1R_1^1=t^e.[Wl^1.(\phi i.Ls+\phi o.Rs)+Wr^1.(\phi i.Rs+\phi o.Ls)]\\0R_1^1=t^r\\1R_1^2=t^e.[Wl^2.(\phi i.Ls+\phi o.Rs)+Wr^2.(\phi i.Rs+\phi o.Ls)]+t^c.R_1^1\\0R_1^2=t^r+t^c.R_1^1\\1R_1^3=t^e.[Wl^3.(\phi i.Ls+\phi o.Rs)+Wr^3.(\phi i.Rs+\phi o.Ls)]+t^c.R^4.\bar{R}^1\\0R_1^3=t^r+t^c.\bar{R}_1^2.\bar{R}_1^1\\1R_1^4=t^e.[Wl^4.(\phi i.Ls+\phi o.Rs)+Wr^4.(\phi i.Rs+\phi o.Ls)]+t^c.(\bar{R}_1^3.R_1^2+\bar{R}_1^3.R_1^1+R_1^3.\bar{R}_1^2.\bar{R}_1^1)\\0R_1^4=t^r+t^c\end{cases}$$

$$(600\text{-}2)a\begin{cases}1R_2^1=t^e.[Wl^j.(\phi i.Rs+\phi o.Ls)+Wr^j.(\phi i.Ls+\phi o.Rs)]\\0R_2^1=t^r\\1R_2^2=(\phi i.Rs+\phi o.Ls).(t^e.Wl^2+t^c.R_2^1)+t^e.Wr^2.(\phi i.Ls+\phi o.Rs)\\0R_2^2=t^r+t^c.R_2^1.(\phi i.Rs+\phi o.Ls)\\1R_2^3=(\phi i.Rs+\phi o.Ls).(t^e.Wl^3+t^c.R_2^4.\bar{R}_2^1)+t^e.Wr^3.(\phi i.Ls+\phi o.Rs)\\0R_2^3=t^r+t^c.\bar{R}_2^2.\bar{R}_2^1.(\phi i.Rs+\phi o.Ls)\\1R_2^4=(\phi i.Rs+\phi o.Ls).[t^e.Wl^4+t^c.(\bar{R}_2^3.R_2^2+\bar{R}_2^3.R_2^1+R_2^3.\bar{R}_2^2.\bar{R}_2^1)]+t^e.Wr^4.(\phi i.Ls+\phi o.Rs)\\0R_2^4=t^r+t^c.(\phi i.Rs+\phi o.Ls)\end{cases}$$

where timing signals $t^e$ and $t^c$ initiate the entry and conversion periods $Te$ and $Tc$, respectively; and signal $t^r$ is utilized to reset all flip-flops to 0 prior to the conversion period.

The equations designated above as 600–1$a$ and 600–2$a$ may be seen from the following discussion. The equations designated as 600–1$a$ are obtained from the equation set forth above for $R_1^j$ and the equations set forth above for 1R1, 0R1, 1R2, 0R2, 1R3, 0R3, 1R4 and 0R4. The portion of each equation initiated by the timing signals $t^e$ are obtained directly from the equation for $R_1^j$ set forth above. The portions of the Equations 600–1$a$ included by the timing signals $t^c$ is obtained from the Equations 1R1 . . . 0R4 set forth above. As discussed fully above, these equations indicate how the flip-flops representing $R_1^j$ are triggered to obtain the representation $(n-X^j)$ during the conversion period $Tc$. As will be seen, each of the flip-flops in the equations designated as 600–1$a$ is reset to its false state at the end of each operation upon the occurrence of a resetting signal $t^r$ so that the flip-flops become properly set for the next operations of entry and conversion. In like manner, the equations designated as 600–2$a$ are obtained by combining the equation designated as $R_2^j$ and the equations designated as 1R1, 0R1 . . . 1R4 and 0R4.

A comparator circuit suitable for making either of the comparisons $D^j \geqq R_1^j$ or $D^j \geqq R_2^j$ is specified by the equations:

$$1Co=(D^4.R^4+\bar{D}^4.\bar{R}^4).(D^3.R^3+\bar{D}^3.\bar{R}^3).(D^2.R^2+\bar{D}^2.\bar{R}^2).(D^1.R^1+\bar{D}^1.\bar{R}^1).t^d$$
$$0Co=t^r$$

where $t^d$ is a timing signal occurring at the beginning of each digit time interval. In operation, the comparators are set to 1 at the beginning of the digit time interval immediately following a comparison indicating equality between $D^j$ and $R^j$. Thus, if $R^j$ is 0000, $Co$ is set to 1 at the beginning of the first digit time interval or, at reference time $t=0$. The general principles of comparator circuits and other suitable forms are described in copending U.S. patent application Serial No. 394,441, for "Electronic Magnitude Comparator," by Robert R. Johnson, filed November 25, 1953. Patent application Serial No. 394,441 has been assigned of record to the assignee of record of this patent application.

The equations for $1Co$ and $0Co$ may be seen from the following discussion: A $1Co$ signal is produced by the comparator 700–1 at the time that the digits in a word correspond to the $R_1^j$ signals from the register 500–1. At such times, the flip-flops forming the counter 800 have patterns of operation corresponding to the patterns provided in the flip-flops included in the register 500–1. For example, operations of the $R^1$, $R^2$, $R^3$ and $R^4$ flip-flops should respectively correspond to the operation of the $D^1$, $D^2$, $D^3$ and $D^4$ flip-flops in the counter 800. This is indicated by the equation for $1Co$ in the previous paragraph. When the flip-flop becomes triggered to the true state of operation, it subsequently becomes triggered to the false state of operation by the resetting pulse $t^r$. This is indicated by the equation $0Co=t^r$.

It will be appreciated that the equations for $1Co$ and $0Co$ two paragraphs above are generalized to represent the operation of either the comparator 700–1 or the comparator 700–2. The operation of the comparator 700–2 would be controlled by the $R_2^1$, $R_2^2$, $R_2^3$ and $R_2^4$ flip-flops. Similarly, the operation of the comparator 700–2 would be controlled by the $R_2^1$, $R_2^2$, $R_2^3$ and $R_2 4$ flip-flops. However, the operation of the comparators 700–1 and 700–2 would be controlled by the same flip-flops representing the successive digits in a word. These are the $D^1$, $D^2$, $D^3$ and $D^4$ flip-flops.

The manner in which specific circuits are mechanized according to corresponding sets of logical equations is illustrated in Figs. 2, 3, 4, 6, and 7 wherein various suitable forms of circuits 200, 300, 400, 600, and 700 are shown. As an example of the general mechanization technique Fig. 2 will be traced in detail. Referring now to Fig. 2 and to defining Equation 200, above, it will be noted that each "and" relationship in the equation is provided by an "and" circuit responsive to the corresponding signals applied to separate input terminals. The "and" circuit produces a 1-representing output signal only when all applied input signals are 1-representing signals. Thus, "and" circuit 201 receives signals $Ls$ and $Co^2$ applied to separate input terminals and produces an output signal representing the function $Ls.Co^2$. Similarly "and' circuit 202 receives signals $Rs$ and $\overline{Co}^2$ and produces a signal $Rs.\overline{Co}^2$. An "or" circuit 203, then, receives the signals $Ls.Co^2$ and $Rs.\overline{Co}^2$ and produces a 1-representing output signal if either or both of these signals is a 1-representing signal, thus providing a signal $$Ls.Co^2+Rs.\overline{Co}^2$$

Finally, the function $I.\phi i.(Ls.Co^2+Rs.\overline{Co}^2)$ is produced in "and" circuit 204. The mechanization of the other logical equations should be apparent from this example.

"And" and "or" circuits are now well-known in the computer art and therefore it is not deemed necessary to consider such circuits in detail in this application. Examples of such circuits are shown on pages 37 to 45 of "High-Speed Computing Devices" by Engineering Research Associates, published in 1950 by McGraw-Hill Book Company, Inc., New York and London, and on pages 511 through 514 of an article entitled "Diode Coincidence and Mixing Circuits in Digital Computers" by Tung Chang Chen, in the Proceedings of the Institute of Radio Engineers, volume 38, May 1950.

The operation of a shift, extracting, and inserting circuit utilizing the circuits shown in Figs. 3*a*, 4*a*, 6*a*, and 7*a* is illustrated in Fig. 1*a*, wherein it is assumed that $Wl^j$ and $Wr^j$ respectively indicate that 4 and 3 digits are to be deleted to the left and right of the series W. The two operations considered are $\phi i.Rs$ and $\phi o.Ls$. As indicated in Fig. 1*a*, the comparator signals $Co^1$ and $Co^2$ are set to 1 after $D^j=9=R_1^j$ and $D^j=8=R_2^j$, respectively, during operation $\phi i.Rs$; and are set to 1 after $D^j=3=R_1^j$ and $D^j=4=R_2^j$, respectively, during operation $\phi o.Ls$. The method of forming the various signal series I*e*, I*se*, O*se*, and O*si* is clearly indicated in Fig. 1*a* so that further explanation is not considered to be necessary.

The operation of the circuitry shown in Figures 3*a*, 4*a*, 5, 6*a* and 7*a* for the example shown in Figure 1*a* may be seen from the following discussion. The circuitry shown in Figure 6*a* receives various signals and operates on a logical basis in accordance with the equations set forth in sets 600–1*a* and 600–2*a* to provide various control signals. As will be seen from Figure 6*a* and from Equations 600–1*a* and 600–2*a*, the values of $Wl^1$, $Wl^2$, $Wl^3$ and $Wl^4$ have to be determined for obtaining the control signals from the matrix (600–1) shown in block form in Figure 1 and in detail in Figure 6*a*. Since $Wl^j$ in the first example of Table I*a* has a decimal value of "4," $Wl^1$, $Wl^2$ and $Wl^4$ have binary values of "0" and $Wl^3$ has a binary value of "1." Similarly, values of $Wr^1$, $Wr^2$, $Wr^3$ and $Wr^4$ have to be determined in connection with the operation of the control matrix (600–2) as set forth in Equations 600–2*a*. Since the first example in Figure 1*a* sets forth a decimal value of "3" for $Wr^j$, $Wr^1$ and $Wr^2$ have binary values of "1" and $Wr^3$ and $Wr^4$ have binary values of "0."

The signals produced by the control matrix 600 are introduced to control register 500–1 to trigger flip-flops $R(1)_1$, $R(2)_1$, $R(3)_1$ and $R(4)_1$ to a corresponding pattern of operation. Flip-flops corresponding to the flip-flops $R(1)_1$, $R(2)_1$, $R(3)_1$ and $R(4)_1$ are shown in Figure 5. In the first example in Figure 1*a*, the flip-flops $R(1)_1$ and $R(2)_1$ are initially triggered to the true state and the flip-flops $R(3)_1$ and $R(4)_1$ are maintained in the false state. This corresponds to a decimal value of "3" for $Wr^j$. As will be seen from Table II, the pattern of operation of the flip-flops $R(1)_1$, $R(2)_1$, $R(3)_1$ and $R(4)_1$ have to be subsequently complemented to obtain the value of $n-Wr^j$. This causes the $R(1)_1$ and $R(4)_1$ flip-flops to become operative in the true states and the $R(2)_1$ and $R(3)_1$ flip-flops to become operative in the false states. This corresponds to a decimal value of "9" when there are 12 digits in a word. The initial setting and subsequent complementation of the $R(1)_1$, $R(2)_1$, $R(3)_1$ and $R(4)_1$ flip-flops are obtained by the matrix 600–1 in Figure 1 and the circuitry shown in Figure 6*a*.

Because of the decimal value of "9" set forth for the $R(1)_1$, $R(2)_1$, $R(3)_1$ and $R(4)_1$ flip-flops, the comparator 500–1 shown in Figure 1 and in Figure 7*a* becomes operative to trigger the $Co(1)$ flip-flop to the true state only in positions 10, 11 and 12 for a word. This causes the $Co(1)$ flip-flop to remain in the false state during the first 9 positions in the word as indicated in Figure 1*a* by a "0" for $Co^1$ and a "1" for $\overline{Co}^1$ in these positions and as indicated by the operation of the comparator 700–1 in Figure 1 and of the comparator shown in Figure 7*a*.

The control register 500–2 operates in a manner similar to the register 500–1. It receives the decimal value of "4" representing $Wl^j$ and subsequently converts this to a decimal value of "8" representing $n-Wl^j$ as set forth in Table II. Because of this, the comparator 700–2 shown in block form in Figure 1 and in detail in Figure 7*a* remains in the false state during the first 8 positions of the word and subsequently becomes triggered to the true state. A decimal value of "8" is represented by a true state of the $R(3)$ flip-flop and by false states of the $R(1)$, $R(2)$ and $R(4)$ flip-flops.

The circuitry shown in Figure 2 operates in accordance with Equation 200 set forth above. This causes the circuitry designated as 200 in Figures 1 and 2 to pass the signal information during the first 8 positions of the word corresponding to the time that the $Co(2)$ flip-flop is in the false state of operation. This is indicated in the first example in Figure 1*a* on the horizontal line in which the equation for I*e* is set forth. The shifting circuit 100 in Figure 1 then operates to shift the signals passed by the circuit 200 so that the portion $Wr^j$ is in the position of greatest digital significance and the portion W is in the positions of least digital significance. This is indicated in the first example in Figure 1 on the horizontal line designated Ise.

The control circuit 300 in Figures 1 and 3*a* is operative in accordance with Equation 300*a* set forth above. For a right shift operation during input phase $\phi i$, the control circuit 300 passes signals only during the time that the $Co(1)$ flip-flop is false. This causes only the portion W to pass through the circuit, as indicated in the first example of Figure 1*a* on the horizontal line designated as *Ose*. As will be seen, Figure 1*a* illustrates two examples, the first one relating to a $\phi i.Rs$ operation and the second relating to a $\phi o.Ls$ operation. In the $\phi o.Ls$ operation, only the portion W of the word is provided and this portion is provided in the digital positions of least significance. Table II indicates that the value of $R_1{}^j$ corresponds to the decimal value of $Wr_1{}^j$ which is provided with a value of "3" in the second example set forth in Figure 1*a*. This causes the stage 600–1 in Figure 1 and the corresponding circuitry shown in Figure 6*a* to introduce signals to flip-flops corresponding to those shown in Figure 5 so as to trigger the flip-flops shown in Figure 5 to a decimal value of "3." For such a value, the flip-flops $R(1)_1$ and $R(2)_1$ operate in the true states and the flip-flops $R(3)_1$ and $R(4)_1$ operate in the false states. Because of this, the comparison flip-flop $Co(1)$ is in the false state during the first, second and third digital positions of the word and thereafter is in the true state. This may be seen from Figure 1*a* in the horizontal columns designated as "$Co^1$" and "$\overline{Co^1}$" for the second example in that figure.

In order to obtain the proper setting of the flip-flops in the control register 500–2 set forth in block form in Figure 1*a*, the flip-flops $R(1)_2$, $R(2)_2$ and $R(4)_2$ are first set to a value of $Wl^j$ in accordance with the operation of the circuitry in Figure 6*a* corresponding to the stage 600–2 in Figure 1. The flip-flops $R(1)_2$, $R(2)_2$, $R(3)_2$ and $R(4)_2$ are thereafter set to a value of $n-Wl^j$ in accordance with the equations set forth in the set 600–2*a*. Since $Wl^j$ has a decimal value of "4," the flip-flops in the control register 500–2 shown in block form in Figure 1*a* and in detailed form in Figure 5 are set to a decimal value of "8" to obtain the complementary value of $(n-Wl^j)$. This causes the comparison flip-flop $Co(2)$ to have a false state during the first 8 positions and a true state in the remaining digits of the word in accordance with the operation of the comparator 700–2 in Figure 1 and the corresponding comparator in Figure 7*a*. The portion W of the word is shifted by the circuit 100 to obtain the signals *Is*. The shifted position of the portion W is indicated in the second example of Figure 1*a* at the horizontal column designated as "*Is*." The third horizontal column in the second example of Figure 1*a* is indicated as "$\overline{Co^2}.Co^1$." As will be seen from the example shown in Figure 1*a*, $\overline{Co^2}$ is false at the same time that $Co^1$ is true only in the middle portion of the word corresponding to the portion W after being shifted by the circuit 100. This is the only portion of the word that is passed by the circuit 400 in Figures 1 and 4*a*, as will be seen in the last horizontal column of the second example in Figure 1*a*. Only the portion W is passed by the circuit 400 because of the operation of the circuitry shown in Figure 4*a* in accordance with the logic set forth in Equation 400*a* above.

In many applications of the present invention, it is necessary to shift, extract, and insert information digits where certain of the *n* digits of the group are not numerical digits. In an illustrative situation a right-hand digit may represent a sign and the left-hand digit may be a zero or blank. In such situations the functional definitions of the various circuits must be modified somewhat, a few of the variations possible being considered below where it is assumed that the right-hand and left-hand extreme digits of the *n*-digit group are additional digits, not considered to be part of $Wr^j$ and $Wl^j$. The operation of the shifting, extracting, and inserting circuit under these conditions is illustrated in Table IV below:

*Table IV*

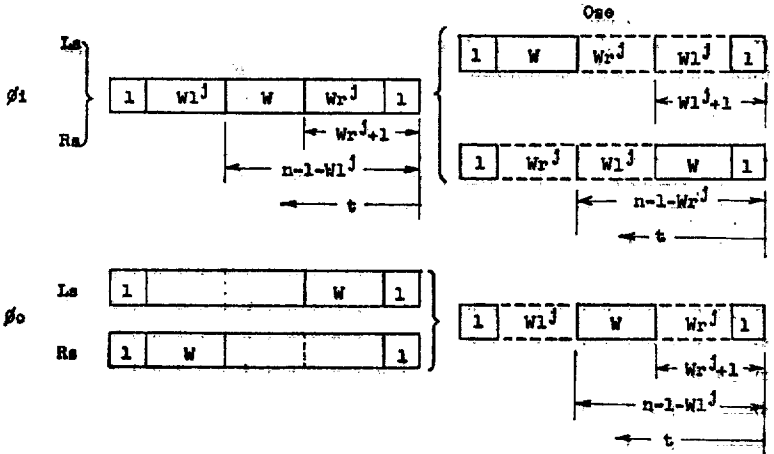

From Table IV the signal series *Ie*, *Ose*, and *Osi* may be defined as follows:

$$Ie=I.\phi i.[Ls.(t\geqq Wr^j+1)+Rs.(t\leqq n-1-Wl^j)]$$
$$Ose=Ise.\phi i.[Ls.(t\geqq Wl^j+1)+Rs.(t\leqq n-1-Wr^j)]$$
$$Osi=Is.\phi o.[(t\geqq Wr^j+1).(t\leqq n-1-Wl^j)]$$

A complete set of shift, extract, and insert functions may now be specified as in Table V.

*Table V*

| | Extract-Insert Functions | | Shift | Register Signals | | Comparison Signals | |
|---|---|---|---|---|---|---|---|
| | | | | $R_2{}^j$ | $R_1{}^j$ | $Co^2$ | $Co^{1a}, Co^{1b}$ |
| $\phi i$ Ls | $t\geqq Wr^j+1$ | $t\geqq Wl^j+1$ | $Wl^j$ | $Wr^j+1$ | $Wl^j-1$ | $Co^2=1$ | $Co^{1a}.Co^{1b}=1$ |
| $\phi i$ Rs | $t\leqq n-1-Wl^j$ | $t\leqq n-1-Wr^j$ | $n-Wr^j$ | $n-1-Wl^j$ | $n-1-Wr^j$ | $\overline{Co^2}=1$ | $\overline{Co^{1a}}+\overline{Co^{1b}}=1$ |
| $\phi o$ Ls | $t\leqq n-1-Wl^j$ | $t\geqq Wr^j+1$ | $Wr^j$ | $n-1-Wl^j$ | $Wr^j-1$ | $\overline{Co^2}=1$ | $\overline{Co^{1a}}.Co^{1b}=1$ |
| $\phi o$ Rs | $t\geqq Wr^j+1$ | $t\leqq n-1-Wl^j$ | $n-Wl^j$ | $Wr^j+1$ | $n-1-Wl^j$ | $Co^2=1$ | $\overline{Co^{1a}}+\overline{Co^{1b}}=1$ |

where $$Co^{1a}=1 \text{ for } D^j=R_1^j$$
$$=0 \text{ after } Co^{1b}=1$$
$$Co^{1b}=1 \text{ one digit after } Co^{1a}=1$$

The functions of Table V are similar to those considered above except that two comparator signals $Co^{1a}$ and $Co^{1b}$ are utilized in the place of comparator signal $Co^1$. This is required because a comparison of $D^j$ and $R_1^j$ does not give $t \geq Wl^j+1$ or $t \geq Wr^j+1$ for Ls, as is required, but rather $t \geq Wl^j-1$ or $t \geq Wr^j-1$. Effectively, the comparator signal $\overline{Co^{1a}}.Co^{1b}$ corresponds to the signal $Co^1$ previously considered, delayed by two digit intervals. This delay compensates for the discrepancy between $R_1^j$ and the desired extract or insert signal. The change in definition of the code sets $R_1^j$ otherwise causes no difficulty for shifting control since $n$ distinct binary sets remain and the shift control matrix is modified accordingly. In this connection reference is made to the above-mentioned copending application by Michael May et al., wherein a specific shift control matrix is illustrated.

The signals Ie, Ose, and Osi may now be defined as functions of the comparator signals in the following manner:

$$(200) \quad Ie=I.\phi i.(Ls.\overline{Co^2}+Rs.Co^2)$$

$$(300)b \quad Ose=Ise.\phi i.[Ls.\overline{Co^{1a}}.Co^{1b}+Rs.(\overline{Co^{1a}}+\overline{Co^{1b}})]$$

$$(400)b \quad Osi= Is.\phi o.[Ls.\overline{Co^2}.\overline{Co^{1a}}.Co^{1b}+Rs.Co^2.(\overline{Co^{1a}}+\overline{Co^{1b}})]$$

The control register sets are defined in the following manner:

$$R_1^j=Te.[Wl^j.(\phi i.Ls+\phi o.Rs)+Wr^j.(\phi i.Rs+\phi o.Ls)]+Tc.[Ls.(X^j-1)+Rs.(n-1-X^j)]$$

$$R_2^j=Te.[Wl^j.(\phi i.Rs+\phi o.Ls)+Wr^j.(\phi i.Ls+\phi o.Rs)]+Tc.[(\phi i.Rs+\phi o.Ls).(n-1-X^j)+(\phi i.Ls+\phi o.Rs).(X^j+1)]$$
$$=(\phi i.Rs+\phi o.Ls).[Te.Wl^j+Tc.(n-1-X^j)]+(\phi i.Ls+\phi o.Rs).[Te.Wr^j+Tc.(X^j+1)]$$

The code translations required are indicated in Table VI, where $n$ again is assumed to be 12 and a conventional binary code is utilized to represent the various code sets.

*Table VI*

| | $X^j=Wr^j$ or $Wl^j$ | | | | $11-X^j=Y^j$ | | | | $X^j-1=W^j$ | | | | $X^j+1=Z^j$ | | | |
|---|---|---|---|---|---|---|---|---|---|---|---|---|---|---|---|---|
| | $X^4$ | $X^3$ | $X^2$ | $X^1$ | $Y^4$ | $Y^3$ | $Y^2$ | $Y^1$ | $W^4$ | $W^3$ | $W^2$ | $W^1$ | $Z^4$ | $Z^3$ | $Z^2$ | $Z^1$ |
| (0)---- | 0 | 0 | 0 | 0 | 1 | 0 | 1 | 1 | 1 | 0 | 1 | 1 | 0 | 0 | 0 | 1 |
| (1)---- | 0 | 0 | 0 | 1 | 1 | 0 | 1 | 0 | 0 | 0 | 0 | 0 | 0 | 0 | 1 | 0 |
| (2)---- | 0 | 0 | 1 | 0 | 1 | 0 | 0 | 1 | 0 | 0 | 0 | 1 | 0 | 0 | 1 | 1 |
| (3)---- | 0 | 0 | 1 | 1 | 1 | 0 | 0 | 0 | 0 | 0 | 1 | 0 | 0 | 1 | 0 | 0 |
| (4)---- | 0 | 1 | 0 | 0 | 0 | 1 | 1 | 1 | 0 | 0 | 1 | 1 | 0 | 1 | 0 | 1 |
| (5)---- | 0 | 1 | 0 | 1 | 0 | 1 | 1 | 0 | 0 | 1 | 0 | 0 | 0 | 1 | 1 | 0 |
| (6)---- | 0 | 1 | 1 | 0 | 0 | 1 | 0 | 1 | 0 | 1 | 0 | 1 | 0 | 1 | 1 | 1 |
| (7)---- | 0 | 1 | 1 | 1 | 0 | 1 | 0 | 0 | 0 | 1 | 1 | 0 | 1 | 0 | 0 | 0 |
| (8)---- | 1 | 0 | 0 | 0 | 0 | 0 | 1 | 1 | 0 | 1 | 1 | 1 | 1 | 0 | 0 | 1 |
| (9)---- | 1 | 0 | 0 | 1 | 0 | 0 | 1 | 0 | 1 | 0 | 0 | 0 | 1 | 0 | 1 | 0 |

| $t=D^j$ | |
|---|---|
| 4321 | $t$ |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 0000 | 12=0 |

The basic conversion functions may be derived from Table VI in the following manner:

$$Y^1=W^1=Z^1=\bar{X}^1$$
$$Y^2=\bar{X}^2$$
$$Y^3=X^3$$
$$Y^4=\bar{X}^4.\bar{X}^3$$

$$W^2=Z^2=\bar{X}^2.\bar{X}^1+X^2.X^1$$
$$W^3=X^3.(X^2+X^1)+X4.\bar{X}^1$$
$$W^4=\bar{X}^4.\bar{X}^3.\bar{X}^2.\bar{X}^1+X^4.X^1$$

$$Z^3=X^3.(\bar{X}^2+\bar{X}^1)+\bar{X}^3.X^2.X^1$$
$$Z^4=X^3.X^2.X^1+X^4$$

The corresponding flip-flop conversion sets may be specified as follows, groups Y, W, and Z respectively designating flip-flop conversion functions for forming $11-X^j$, $X^j-1$, and $X^j+1$.

$$Y=11-X^j \begin{cases} 1R1=0R1=1 \\ 1R2=0R2=1 \\ 1R^3=0R^3=0 \\ 1R4=\bar{R}^3 \\ 0R4=1 \end{cases}$$

$$W=X^j-1 \begin{cases} 1R1=0R1=1 \\ 1R2=0R2=\bar{R}^1 \\ 1R3=R^4.\bar{R}^1 \\ 0R3=\bar{R}^2.\bar{R}^1 \\ 1R4=\bar{R}^3.\bar{R}^2.\bar{R}^1 \\ 0R4=\bar{R}^1 \end{cases}$$

$$Z=X^j+1 \begin{cases} 1R1=0R1=1 \\ 1R2=0R2=R^1 \\ 1R3=0R3=R^2.R^1 \\ 1R4=R^3.R^2.R^1 \\ 0R4=0 \end{cases}$$

The flip-flop entry and conversion functions may now be written as follows:

$$(600\text{-}1)b \begin{cases} 1R_1^1=t^e.[Wl^1.(\phi i.Ls+\phi o.Rs)+Wr^1.(\phi i.Rs+\phi o.Ls)] \\ 0R_1^1=t^r+t^e \\ 1R_1^2=t^e.[Wl^2.(\phi i.Ls+\phi o.Rs)+Wr^2.(\phi i.Rs+\phi o.Ls)]+ \rightarrow t^c.(Ls.\bar{R}_1^1+Rs) \leftarrow \\ 0R_1^2=t^r+ \\ 1R_1^3=t^e.[Wl^3.(\phi i.Ls+\phi o.Rs)+Wr^3.(\phi i.Rs+\phi o.Ls)]+ t^c.Ls.R_1^4.\bar{R}_1^1 \\ 0R_1^3=t^r+t^c.Ls.\bar{R}_1^2.\bar{R}_1^1 \\ 1R_1^4=t^e.[Wl^4.(\phi i.Ls+\phi o.Rs)+Wr^1.(\phi i.Rs+ \phi o.Ls)]+t^c.(Ls.\bar{R}_1^3.\bar{R}_1^2.\bar{R}_1^1+Rs.\bar{R}_1^1) \\ 0R_1^4=t^r+t^c.(Ls.\bar{R}_1^1+Rs) \end{cases}$$

$$(600\text{-}2)b \begin{cases} 1R_2^1=t^e.[Wl^1.(\phi i.Rs+\phi o.Ls)+Wr^1.(\phi i.Ls+\phi o.Rs)]+t^c \\ 0R_2^1=t^r+t^c \\ 1R_2^2=t^e.[Wl^2.(\phi i.Rs+\phi o.Ls)+Wr^2.(\phi i.Ls+\phi o.Rs)]+ \rightarrow t^c.[(\phi i.Rs+\phi o.Ls)+(\phi i.Ls+\phi o.Rs).R_2^1] \leftarrow \\ 0R_2^2=t^r+ \\ 1R_2^3=t^e.[Wl^3.(\phi i.Rs+\phi o.Ls)+Wr^3.(\phi i.Ls+\phi o.Rs)]+ \rightarrow t^c.(\phi i.Ls+\phi o.Rs).R_1^2.R_1^1 \leftarrow \\ 0R_2^3=t^r+ \\ 1R_2^4=(\phi i.Rs+\phi o.Ls).(t^e.Wl^4+t^c.\bar{R}_2^3)+(\phi i.Ls+ \phi o.Rs).(t^e.Wr^4+t^c.R_2^3.R_2^2.R_2^1) \\ 0R_2^4=t^r+t^c.(\phi i.Rs+\phi o.Ls) \end{cases}$$

The comparator signals $Co^{1a}$ and $Co^{1b}$ are provided by flip-flops $Co1a$ and $Co1b$ receiving signals defined in the following manner:

$$(700)b \begin{cases} 1Co1a=(D^4.R^4+\bar{D}^4.\bar{R}^4).(D^3.R^3+\bar{D}^3.\bar{R}^3).(D^2.R^2+ \bar{D}^2.\bar{R}^2).(D^1.R^1+\bar{D}^1.\bar{R}^1).t^d \\ 0Co1a=t^r+Co^{1b} \\ 1Co1b=Co^{1a}.t^d \\ 0Co1b=t^r \end{cases}$$

Signal $Co^2$ is provided as previously discussed, the mechanization being shown in Fig. 7a, defined according to Equation 700a.

In the discussion thus far only one set of mechanization functions has been derived for each group of tables. Thus, Equations 600–1b, 600–2b, and 700b illustrate one mechanization set suitable for providing the conversions indicated in Tables V and VI above. It will now be established that each group of tables defining a particular set of extract-insert functions and shift functions may be considered to define an entire class of mechanization functions wherein a considerable number of variations are possible.

As an illustrative case, consider the variation in the functions indicated in Tables V and VI wherein the time reference sets $D^j$ are defined so that each set $D^j$ represents time interval $t$ as a conventional binary number $t+1$. Thus, when $t=0$, set $D^j$ is coded as 0001 and when $t=5$, $D^j$ is coded as 0110. With this definition of sets $D^j$, then, the comparison $D^j \geq R^j$ produces comparator signals which assume 1-representing values 1 digit time interval earlier than in the situation where $t=D^j$. Thus, in order to derive the proper extract-insert functions, it is necessary to add 1 to the register signals $R_2^j$ and $R_1^j$ previously defined in Table V. This modification provides the arrangement illustrated in Tables VII and VIII, respectively illustrating variations of Tables V and VI wherein $D^j=t+1$.

*Table VII (modified Table V)*

$$t+1=D^j \geq R^j$$

| | Extract-Insert Functions | | Shift Functions | Register Signals | |
|---|---|---|---|---|---|
| | | | | $R_2^j$ | $R_1^j$ |
| $\phi i$ { $Ls$ | $t \geq Wr^j+1$ | $t \geq Wl^j+1$ | $Wl^j$ | $Wr^j+2$ | $Wr^j$ |
| $\phi i$ { $Rs$ | $t \leq n-1-Wl^j$ | $t \leq n-1-Wr^j$ | $n-Wr^j$ | $n-Wl^j$ | $n-Wr^j$ |
| $\phi o$ { $Ls$ | $t \leq n-1-Wl^j$ | $t \geq Wr^j+1$ | $Wr^j$ | $n-Wl^j$ | $Wr^j$ |
| $\phi o$ { $Rs$ | $t \geq Wr^j+1$ | $t \leq n-1-Wl^j$ | $n-Wl^j$ | $Wr^j+2$ | $n-Wl^j$ |

*Table VIII (modified Table VI)*

$$n=12$$

| | $X^j=Wr^j$ or $Wl^j$ | | | | $12-X^j=Y^j$ | | | | $X^j+2=W^j$ | | | |
|---|---|---|---|---|---|---|---|---|---|---|---|---|
| | $X^4$ | $X^3$ | $X^2$ | $X^1$ | $Y^4$ | $Y^3$ | $Y^2$ | $Y^1$ | $W^4$ | $W^3$ | $W^2$ | $W^1$ |
| (0) | 0 | 0 | 0 | 0 | 0 | 0 | 0 | 0 | 0 | 0 | 1 | 0 |
| (1) | 0 | 0 | 0 | 1 | 1 | 0 | 1 | 1 | 0 | 0 | 1 | 1 |
| (2) | 0 | 0 | 1 | 0 | 1 | 0 | 1 | 0 | 0 | 1 | 0 | 0 |
| (3) | 0 | 0 | 1 | 1 | 1 | 0 | 0 | 1 | 0 | 1 | 0 | 1 |
| (4) | 0 | 1 | 0 | 0 | 1 | 0 | 0 | 0 | 0 | 1 | 1 | 0 |
| (5) | 0 | 1 | 0 | 1 | 0 | 1 | 1 | 1 | 0 | 1 | 1 | 1 |
| (6) | 0 | 1 | 1 | 0 | 0 | 1 | 1 | 0 | 1 | 0 | 0 | 0 |
| (7) | 0 | 1 | 1 | 1 | 0 | 1 | 0 | 1 | 1 | 0 | 0 | 1 |
| (8) | 1 | 0 | 0 | 0 | 0 | 1 | 0 | 0 | 1 | 0 | 1 | 0 |
| (9) | 1 | 0 | 0 | 1 | 0 | 0 | 1 | 1 | 1 | 0 | 1 | 1 |

| $D^j=t+1$ | |
|---|---|
| 0001 | 0 |
| 0010 | 1 |
| 0011 | 2 |
| 0100 | 3 |
| 0101 | 4 |
| 0110 | 5 |
| 0111 | 6 |
| 1000 | 7 |
| 1001 | 8 |
| 1010 | 9 |
| 1011 | 10 |
| 0000 | 11 |

The comparison signals are omitted from Table VII since they are the same as in Table V. The manner in which specific mechanization functions may be derived from Tables VII and VIII should be apparent from the examples already considered.

Several other interesting modifications are possible. Consider, for example, the situation illustrated in Tables IX and X, below, wherein $D^j=n-1-t$. This timing definition effectively requires that each register signal set $R^j$ of Table V be replaced with the set $R^j=n-1-R^j$. Thus, the set $R_1^j=Wl^j-1$, for operation $\phi i.Ls$ in Table V is replaced with $R_1^j=n-1-(Wl^j-1)=n-Wl^j$ and the set $R_2^j=Wr^j+1$ for operation $\phi i.Ls$ in Table V is replaced with $R_2^j=n-1-(Wr^j+1)=n-2-Wr^j$. This translation provides the mechanization sets defined by Tables IX and X below.

*Table IX (modified Table V)*

$$n-1-t=D^j$$

| | Extract-Insert Functions | | Shift Functions | Register Signals | |
|---|---|---|---|---|---|
| | | | | $R_2^j$ | $R_1^j$ |
| $\phi i$ { Ls | $t \geq Wr^j+1$ | $t \geq Wl^j+1$ | $Wl^j$ | $n-2-Wr^j$ | $n-Wl^j$ |
| $\phi i$ { Rs | $t \leq n-1-Wl^j$ | $t \leq n-1-Wr^j$ | $n-Wr^j$ | $Wl^j$ | $Wr^j$ |
| $\phi o$ { Ls | $t \leq n-1-Wl^j$ | $t \geq Wr^j+1$ | $Wr^j$ | $n-2-Wr^j$ | $n-Wr^j$ |
| $\phi o$ { Rs | $t \geq Wr^j+1$ | $t \leq n-1-Wl^j$ | $n-Wl^j$ | $Wr^j$ | $Wl^j$ |

The comparison functions are again omitted since they are similar to those in Table V, and the manner of deriving the mechanization functions is again considered to be apparent from previous examples. It will be noted that the set $R_1^j$ differs from the desired shift functions and consequently the shift control matrix must be redefined to provide the desired selection operation.

In the preceding discussion it has been assumed that it is preferable to perform shift selections in accordance with a set of $n$ distinct shift signals where right shift signals are the $n$'s complement of left shift signal. It is possible, however, to simplify the comparator circuit by defining separate shift selections for right and left shift. The general logical definition of such a system is illustrated in Tables XI and XII below wherein the necessary shift selections for left and right shift are indicated. It will be noted also that as an illustration of another variation the comparators are defined as providing the comparison $D^j > R^j$ which effectively adds 1 digit time interval to the comparison output signals.

*Table X (modified Table VI)*

$n=12$

| | $X^j=Wr^j$ or $Wl^j$ | | | | $12-X^j=Y^j$ | | | | $10-X^j=W^j$ | | | |
|---|---|---|---|---|---|---|---|---|---|---|---|---|
| | $X^4$ | $X^3$ | $X^2$ | $X^1$ | $Y^4$ | $Y^3$ | $Y^2$ | $Y^1$ | $W^4$ | $W^3$ | $W^2$ | $W^1$ |
| (0) | 0 | 0 | 0 | 0 | 0 | 0 | 0 | 0 | 1 | 0 | 1 | 0 |
| (1) | 0 | 0 | 0 | 1 | 1 | 0 | 1 | 1 | 1 | 0 | 0 | 1 |
| (2) | 0 | 0 | 1 | 0 | 1 | 0 | 1 | 0 | 1 | 0 | 0 | 0 |
| (3) | 0 | 0 | 1 | 1 | 1 | 0 | 0 | 1 | 0 | 1 | 1 | 1 |
| (4) | 0 | 1 | 0 | 0 | 1 | 0 | 0 | 0 | 0 | 1 | 1 | 0 |
| (5) | 0 | 1 | 0 | 1 | 0 | 1 | 1 | 1 | 0 | 1 | 0 | 1 |
| (6) | 0 | 1 | 1 | 0 | 0 | 1 | 1 | 0 | 0 | 1 | 0 | 0 |
| (7) | 0 | 1 | 1 | 1 | 0 | 1 | 0 | 1 | 0 | 0 | 1 | 1 |
| (8) | 1 | 0 | 0 | 0 | 0 | 1 | 0 | 0 | 0 | 0 | 1 | 0 |
| (9) | 1 | 0 | 0 | 1 | 0 | 0 | 1 | 1 | 0 | 0 | 0 | 1 |

| $D^j=11-t$ | |
|---|---|
| 1011 | 0 |
| 1010 | 1 |
| 1001 | 2 |
| 1000 | 3 |
| 0111 | 4 |
| 0110 | 5 |
| 0101 | 6 |
| 0100 | 7 |
| 0011 | 8 |
| 0010 | 9 |
| 0001 | 10 |
| 0000 | 11 |
| 1011 | 12=0 |

*Table XI*

$D^j>R^j$

| | Extract-Insert Functions | | Shift Functions | Register Signals | | Comparison Signals | |
|---|---|---|---|---|---|---|---|
| | | | | $R_2^j$ | $R_1^j$ | $Co^2$ $D^j>R_2^j$ | $Co^1$ $D^j>R_1^j$ |
| $\phi i$ Ls | $t\geq Wr^j+1$ | $t\geq Wl^j+1$ | $Wl^j$ | $Wr^j$ | $Wl^j$ | $Co^2=1$ | $Co^1=1$ |
| $\phi i$ Rs | $t\leq n-1-Wl^j$ | $t\leq n-1-Wr^j$ | $n-Wr^j$ | $n-2-Wl^j$ | $n-2-Wr^j$ | $\overline{Co^2}=1$ | $\overline{Co^1}=1$ |
| $\phi o$ Ls | $t\leq n-1-Wl^j$ | $t\geq Wr^j+1$ | $Wr^j$ | $n-2-Wl^j$ | $Wr^j$ | $\overline{Co^2}=1$ | $Co^1=1$ |
| $\phi o$ Rs | $t\geq Wr^j+1$ | $t\leq n-1-Wl^j$ | $n-Wl^j$ | $Wr^j$ | $n-2-Wl^j$ | $Co^2=1$ | $\overline{Co^1}=1$ |

*Table XII*

$n=12$

| | $X^j=Wr^j$ or $Wl^j$ | | | | $10-X^j=Y^j$ | | | | Shift Selection | |
|---|---|---|---|---|---|---|---|---|---|---|
| | $X^4$ | $X^3$ | $X^2$ | $X^1$ | $Y^4$ | $Y^3$ | $Y^2$ | $Y^1$ | Ls | Rs |
| (0) | 0 | 0 | 0 | 0 | 1 | 0 | 1 | 0 | R0 | R2 |
| (1) | 0 | 0 | 0 | 1 | 1 | 0 | 0 | 1 | R1 | R3 |
| (2) | 0 | 0 | 1 | 0 | 1 | 0 | 0 | 0 | R2 | R4 |
| (3) | 0 | 0 | 1 | 1 | 0 | 1 | 1 | 1 | R3 | R5 |
| (4) | 0 | 1 | 0 | 0 | 0 | 1 | 1 | 0 | R4 | R6 |
| (5) | 0 | 1 | 0 | 1 | 0 | 1 | 0 | 1 | R5 | R7 |
| (6) | 0 | 1 | 1 | 0 | 0 | 1 | 0 | 0 | R6 | R8 |
| (7) | 0 | 1 | 1 | 1 | 0 | 0 | 1 | 1 | R7 | R9 |
| (8) | 1 | 0 | 0 | 0 | 0 | 0 | 1 | 0 | R8 | R10 |
| (9) | 1 | 0 | 0 | 1 | 0 | 0 | 0 | 1 | R9 | R11 |

| $D^j=t$ | |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 0000 | 12=0 |

In Table XII the symbols R0 through R11 represent reading circuits in a high-speed shifting circuit such as is described in the above-mentioned application by Michael May et al. Each reading circuit R*k*, *k* representing any of the integers 0 through 11, provides output signals in response to applied input signals after delays of *k* digit time intervals. As is more fully explained in the copending application by Michael May et al., circuit R*k* provides left shifts of *k* digits and right shifts of $n-k$ digits. Thus, in referring to Table XII, it will be noted that where $X^j$, representing either $Wr^j$ or $Wl^j$, assumes any of the values 0 through 9, circuits R0 through R9 provide the desired left shift. The right shift selection, however, is more complicated. As indicated in Table XI during right shift operations the register signals $R_2^j$ represent $n-2-X^j$ or, where $n=12$, represent $10-X^j$. Thus, when $10-X^j$ represents a number *k*, the number originally entered into the shift control register must have been $10-k$ and the circuit which must be selected to provide the desired right shift is circuit $R[12-(10-k)]=R(2+k)$. Thus, when $X^j$ is 0, the shift selection for right shift is circuit R2 and when $X^j$ is 5, the shift selection for right shift is circuit R7, and so forth.

From the foregoing discussion it is apparent that the present invention provides a high-speed shifting, extracting, and inserting circuit which may be utilized efficiently in an electrical business data system for rapidly preparing serial input information for operation and for inserting results of operations into output data sets. Although only a few modifications of the invention have been described in detail, it will be understood that a considerable variety of mechanizations are possible. For example, the insertion circuits described may be utilized with minor changes to perform extractions and likewise the extraction circuits may be utilized to perform insertions. Thus, subcombinations of separate shifting and extracting and shifting and inserting circuits may be provided according to the present invention.

While two specific mechanizations of conversion matrix 600 have been described in considerable detail, it will be understood that other methods may be preferred. For example, it may be desirable to shift the selection sets $Wr^j$ and $Wl^j$ into the corresponding registers through matrices 600 rather than to enter them in parallel in the manner described.

In addition, this copending application introduces certain modifications wherein the extraction and insertion circuits are simplified so that only single output extraction is performed. It will be understood, therefore, that the present invention is not limited to the particular extraction and insertion techniques introduced but rather to the general concept of simultaneously shifting and extracting or shifting and inserting wherein applied control signal sets are converted in a manner making it possible to completely define all of the shift and extracting or shifting and inserting information which is required.

What is claimed as new is:

1. An electronic circuit for selectively shifting, extracting, and inserting a digital information group, represented by a series of electrical input signals, the circuit being operable, in response to an applied set of control signals, to prepare the input signals for a subsequent operation by simultaneously shifting and extracting a selected serial portion thereof, or to prepare a selected serial portion of the input signals for entry into a predetermined position in another information group, by simultaneously shifting and inserting the selected serial portion into the predetermined position; said circuit comprising: matrix conversion means, responsive to the control signals for producing shift selection signals indicating the amount of shift specified by the control signals and for producing extract-insert signal sets indicating the amount of extraction or insertion specified by the control signals; comparison means responsive to said extract-insert signal sets and to applied digit time reference signals for producing extraction-indicating and insertion-indicating signal series indicating the selected serial portion of the input signals; shifting means, responsive to said shift selection signals for shifting the input signals by an amount specified thereby and producing corresponding shifted output signals; extraction means, coupled to said shifting means, and responsive to said extraction-indicating signal series, for producing an output signal series corresponding to the selected portion of the input signals; and insertion means, responsive to said shifted output signals and to said insertion-indicating signal series, for inserting the selected portion of the input signals into the other information group.

2. The circuit defined in claim 1 wherein said matrix conversion means includes first and second register means producing signal sets $R_1^j$ and $R_2^j$, respectively, signal set $R_1^j$ being utilized as said shift selection signals, and sets $R_1^j$ and $R_2^j$ together indicating the amount of extraction or insertion specified by the control signals.

3. The circuit defined in claim 2 wherein said comparison means includes first and second comparator circuits for comparing signal sets $R_1^j$ and $R_2^j$ with said applied digit time reference signals, to produce complementary signal series $Co^1$, $\overline{Co}^1$ and $Co^2$, $\overline{Co}^2$, respectively; said extraction-indicating and said insertion-indicating signal series being produced as a function of said complementary signal series.

4. The circuit defined in claim 3 wherein said extraction means includes an input extracting circuit responsive to signal series $Co^2$ and $\overline{Co}^2$ for producing a partially extracted input signal series $Ie$; and an output extracting circuit responsive to signal series $Ise$, corresponding to series $Ie$ shifted by said shifting means, and responsive to signal series $Co^1$ and $\overline{Co}^1$ for producing an output signal series $Ose$ representing the selected serial portion of the input signals.

5. An electronic circuit for preparing a digital information group, represented by a series of electrical input signals for a subsequent operation by simultaneously shifting and extracting a selected serial portion thereof, specified by an applied set of control signals, said circuit comprising: first means, responsive to the control signals for producing shift selection signals indicating the amount of shift specified by the control signals and for producing extract signal sets indicating the amount of extraction specified by the control signals; second means, responsive to said extract signal sets and to applied digit time reference signals for producing extraction-indicating signal series indicating the selected serial portion of the input signals; third means, responsive to said shift selection signals for shifting the input signals by an amount specified thereby to produce corresponding shifted output signals; and fourth means, responsive to said shifted output signals and to said extraction-indicating signal series for producing an output signal series corresponding to the selected portion of the input signals.

6. The circuit defined in claim 5 wherein said fourth means includes an input circuit responsive to the input signals for producing a partially extracted signal series, said partially extracted signal series being applied to, and shifted by said third means; and an output circuit, responsive to said shifted signal series for producing said output signal series.

7. An electronic circuit for preparing a selected portion of a digital information group, represented by a series of electrical input signals, for entry into a predetermined position in another group, by simultaneously shifting and inserting the selected serial portion into the predetermined position, the circuit being operable in response to an applied set of control signals specifying the amount and direction of the shifting and the predetermined position, said circuit comprising: first means, responsive to the control signals for producing shift selection signals indicating the amount of shift specified by the control signals and for producing insert signal sets indicating the amount of insertion specified by the control signals; second means, responsive to said insert signal sets and to applied digit time reference signals for producing insertion-indicating signal series indicating the selected portion of the input signals; third means, responsive to said shift selection signals for shifting the input signals by an amount specified thereby to produce corresponding shifted output signals; and fourth means, responsive to said shifted output signals and to said insertion-indicating signal series for inserting the selected portion of the input signals into the other information group.

8. A high-speed shifting, extracting, and inserting circuit selectively operable, in response to control signals $\phi i$ and $\phi o$, respectively indicating input and output phases of operation, control signals $Rs$ and $Ls$ indicating right and left shift operations, and control signal sets $Wr^j$ and $Wl^j$ indicating the amount of shift, extraction, or insertion; to prepare, during input phases, a series of electrical input signals I representing a digital information group, for a subsequent operation by simultaneously shifting and extracting a serial portion W thereof, the portion W being specified by signal sets $Wr^j$ and $Wl^j$ respectively indicating right-hand and left-hand deletions; or to prepare, during output phases, a selected serial portion W of signals I for entry into a predetermined position in another information group, the position being specified by signal sets $Wr^j$ and $Wl^j$, the entry being performed by simultaneously shifting and inserting the portion W into the predetermined position; said shifting, extracting, and inserting circuit comprising: first means, responsive to signals $\phi i$, $\phi o$, $Rs$, $Ls$, $Wr^j$, and $Wl^j$ for producing signal sets $R_1^j$ and $R_2^j$ indicating the amount of shift and extraction or insertion specified by the control signals, signal set $R_1^j$ being utilized also as a set of shift selection signals; second means, responsive to said signal set $R_1^j$ utilized as shift selection signals, for shifting signals I by an amount specified by the control signals to produce corresponding output signals $Is$; third means, responsive to signal sets $R_1^j$ and $R_2^j$ and to applied digit time reference signals $D^j$ for producing extraction-indicating and insertion-indicating signal series indicating the time of occurrence of the selected portion W; fourth means, responsive to said extraction-indicating signal series for producing an output signal series $Ose$ corresponding to the shifted and selected portion W; and fifth means, responsive to signals $Is$, for producing an output signal series $Osi$ corresponding to the selected portion W to be inserted.

9. The circuit defined in claim 8 wherein signals I represent a digital group including $n$ digits, sets $Wr^j$ and $Wl^j$ indicating the right-hand and left-hand portions of the $n$ digits to be deleted or nonselected; wherein said fourth means produces a partially extracted signal series $Ie$ defined by the logical expression:

$$Ie=I.\phi i.[Ls.(t\geqq Wr^j)+Rs.(t\leqq n-Wl^j)]$$

where the variable $t$ represents an absolute time interval, and the dot (.) represents the logical "and," and the plus (+) the logical inclusive "or"; wherein the signal series $Ie$ is shifted by said second means to produce the shifted signal series $Ise$, said fourth means producing signal series $Ose$ in response to series $Ise$ in accordance with the logical expression:

$$Ose=Ise.\phi i.[Ls.(t\geqq Wl^j)+Rs.(t\leqq n-Wr^j)]$$

and wherein said fifth means produces signal series $Osi$ in accordance with the logical expression:

$$Osi=Is.\phi o.[(t\geqq Wr^j).(t\leqq n-Wl^j)]$$

10. The circuit defined in claim 9 wherein said third means includes first and second comparator circuits for comparing signal sets $R_1^j$ and $R_2^j$ with said applied digit time reference signals $D^j$, to produce complementary signal series $Co^1$, $\overline{Co^1}$ and $Co^2$, $\overline{Co^2}$, respectively; said signals $Ie$, $Ose$, and $Osi$ being respectively produced according to the following logical functions:

$$Ie=I.\phi i.[Ls.Co^2+Rs.\overline{Co^2}]$$

$$Ose=Ise.\phi i.[Ls.Co^1+Rs.\overline{Co^1}]$$

$$Osi=Is.\phi o.[Ls.\overline{Co^2}.Co^1+Rs.Co^2.\overline{Co^1}]$$

11. The circuit defined in claim 10 wherein said first means includes register means for receiving signal sets $R_1^j$ and $R_2^j$; the signal set $R_1^j$ being entered into said register means during the operations $\phi i.Ls$ and $\phi o.Rs$ as a function of the signal set $Wl^j$, and being entered during the operations $\phi i.Rs$ and $\phi o.Ls$ as a function of signal set $Wr^j$, signal set R being converted to a set $n-X^j$ during right shift ($Rs$), where $X^j$ represents either $Wr^j$ or $Wl^j$, the signal set $R_1^j$ being defined by the logical function:

$$R_1^j=Te.[Wl^j.(\phi i.Ls+\phi o.Rs)+Wr^j.(\phi i.Rs+\phi o.Ls)]+Tc.Rs.(n-X^j)$$

where $Te$ and $Tc$ respectively represent time intervals following entry and conversion; and wherein the entry and conversion of signal set $R_2^j$ into said register means is defined by the logical function:

$$\begin{aligned}R_2^j&=Te.[Wl^j.(\phi i.Rs+\phi o.Ls)+Wr^j.(\phi i.Ls+\phi o.Rs)]+Tc.[(\phi i.Rs+\phi o.Ls).(n-X^j)]\\&=(\phi i.Rs+\phi o.Ls).[Te.Wl^j+Tc.(n-X^j)]+Te.Wr^j.(\phi i.Ls+\phi o.Rs)\end{aligned}$$

12. The circuit defined in claim 11 wherein $n$ is 12, the sets $Wr^j$ and $Wl^j$ are represented in a conventional four binary digit code, and said register means includes flip-flops R(1)1, R(2)1, R(3)1, and R(4)1 producing complementary output signal pairs $R_1^1$, $\bar{R}_1^1$; $R_1^2$, $\bar{R}_1^2$; $R_1^3$, $\overline{R_1}^3$; and $R_1^4$, $\overline{R_1}^4$ and having 1 and 0 input circuit pairs $1R_1^1$, $0R_1^1$; $1R_1^2$; $0R_1^2$; $1R_1^3$, $0R_1^3$; and $1R_1^4$, $0R_1^4$, respectively; and includes flip-flops R(1)2, R(2)2, R(3)2, and R(4)2 producing complementary output signal pairs $R_2^1$, $\bar{R}_2^1$; $R_2^2$, $\bar{R}_2^2$; $R_2^3$, $\bar{R}_2^3$; and $R_2^4$, $\bar{R}_2^4$ and having 1 and 0 input circuit pairs $1R_2^1$, $0R_2^1$; $1R_2^2$, $0R_2^2$; $1R_2^3$, $0R_2^3$; and $1R_2^4$, $0R_2^4$, respectively; said first means being mechanized according to the logical equations:

$$1R_1^1=t^e.[Wl^1.(\phi i.Ls+\phi o.Rs)+Wr^1.(\phi i.Rs+\phi o.Ls)]$$
$$0R_1^1=t^r$$
$$1R_1^2=t^e.[Wl^2.(\phi i.Ls+\phi o.Rs)+Wr^2.(\phi i.Rs+\phi o.Ls)]+t^c.R_1^1$$
$$0R_1^2=t^r+t^c.R_1^1$$
$$1R_1^3=t^e.[Wl^3.(\phi i.Ls+\phi o.Rs)+Wr^3.(\phi i.Rs+\phi o.Ls)]+t^c.R_1^4.\bar{R}_1^1$$
$$0R_1^3=t^r+t^c.\bar{R}_1^2.\bar{R}_1^1$$
$$1R_1^4=t^e.[Wl^4.(\phi i.Ls+\phi o.Rs)+Wr^4.(\phi i.Rs+\phi o.Ls)]+t^c.(\bar{R}_1^3.R_1^2+\bar{R}_1^3.R_1^1+R_1^3.\bar{R}_1^2.\bar{R}_1^1)$$
$$0R_1^4=t^r+t^c$$
$$1R_2^1=t^e.[Wl^1.(\phi i.Rs+\phi o.Ls)+Wr^1.(\phi i.Ls+\phi o.Rs)]$$
$$0R_2^1=t^r$$
$$1R_2^2=(\phi i.Rs+\phi o.Ls).(t^e.Wl^2+t^c.R_2^1)+t^e.Wr^2.(\phi i.Ls+\phi o.Rs)$$
$$0R_2^2=t^r+t^c.R_2^1.(\phi i.Rs+\phi o.Ls)$$
$$1R_2^3=(\phi i.Rs+\phi o.Ls).(t^e.Wl^3+t^c.R_2^4.\bar{R}_2^1)+t^e.Wr^3.(\phi i.Ls+\phi o.Rs)$$
$$0R_2^3=t^r+t^c.\bar{R}_2^2.\bar{R}_2^1.(\phi i.Rs+\phi o.Ls)$$
$$1R_2^4=(\phi i.Rs+\phi o.Ls).[t^e.Wl^4+t^c.(\bar{R}_2^3.R_2^2+\bar{R}_2^3.R_2^1+R_2^3.\bar{R}_2^2.\bar{R}_2^1)]+t^e.Wr^4.(\phi i.Ls+\phi o.Rs)$$
$$0R_2^4=t^r+t^c.(\phi i.Rs+\phi o.Ls)$$

where timing signals $t^e$ and $t^c$ initiate the entry and conversion periods $Te$ and $Tc$, respectively; and signal $t^r$ is utilized to reset all flip-flops to 0 prior to the conversion period.

13. The circuit defined in claim 8 wherein signals I represent a digital group including $n$ digits, including a right-hand digit and a left-hand digit, sets $Wr^j$ and $Wl^j$ indicating right-hand and left-hand portions, not including the right-hand and left-hand digits; wherein said fourth means produces a partially extracted signal series $Ie$ defined by the logical expressions:

$$Ie=I.\phi i.[Ls.(t\geqslant Wr^j+1)+Rs.(t\leqslant n-1-Wl^j)]$$

where the variable $t$ represents an absolute time interval, and the dot (.) represents the logical "and," and the plus (+) the logical inclusive "or"; wherein the signal series $Ie$ is shifted by said second means to produce the shifted signal series $Ise$, said fourth means producing signal series $Ose$ in response to series $Ise$ in accordance with the logical expression:

$$Ose=Ise.\phi i.[Ls.(t\geqslant Wl^j+1)+Rs.(t\leqslant n-1-Wr^j)]$$

and wherein said fifth means produces signal series $Osi$ in accordance with the logical expression:

$$Osi=Is.\phi o.[(t\geqslant Wr^j+1).(t\leqslant n-1-Wl^j)]$$

14. The circuit defined in claim 13 wherein said third means includes first and second comparator circuits for comparing signal sets $R_1^j$ and $R_2^j$ with said applied digit time reference signals D, to produce complementary signal series $Co^{1a}$, $\overline{Co}^{1a}$; $Co^{1b}$, $\overline{Co}^{1b}$; and $Co_2$, $\overline{Co_2}$, respectively, said signals $Ie$, $Ose$, and $Osi$ being respectively produced according to the following logical functions:

$$Ie=I.\phi i.(Ls.\overline{Co^2}+Rs.Co^2)$$

$$Ose=Ise.\phi i.[Ls.\overline{Co}^{1a}.Co^{1b}+Rs.(\overline{Co}^{1a}+\overline{Co}^{1b})]$$

$$Osi=Is.\phi o.[Ls.\overline{Co}^2.\overline{Co}^{1a}.Co^{1b}+Rs.Co^2.(\overline{Co}^{1a}+\overline{Co}^{1b})]$$

15. The circuit defined in claim 14 wherein said first means includes register means for receiving signal sets $R_1^j$ and $R_2^j$; the signal set $R_1^j$ being entered into said register means during the operations $\phi i.Ls$ and $\phi o.Rs$ as a function of the signal set $Wl^j$, and being entered during the operations $\phi i.Rs$ and $\phi o.Ls$ as a function of signal set $Wr^j$, signal set $R_1^j$ being converted to a set $n-1-X^j$ during right shifts ($Rs$), where $X^j$ represents either $Wr^j$ or $Wl^j$, and the signal set $R_2^j$ being converted to a set $X^j-1$ during left shifts ($Ls$), the signal set $R_1^j$ being defined by the logical function:

$$R_1^j=Te.[Wl^j.(\phi i.Ls+\phi o.Rs)+Wr^j.(\phi i.Rs+\phi o.Ls)]+Tc.[Ls.(X^j-1)+Rs.(n-1-X^j)]$$

where T$e$ and T$c$ respectively represent time intervals following entry and conversion; and wherein the entry and conversion of signal set $R_2^j$ into said register means is defined by the logical function:

$$R_2^j=Te.[Wl^j.(\phi i.Rs+\phi o.Ls)+Wr^j.(\phi i.Ls+\phi o.Rs)]+Tc.[(\phi i.Rs+\phi o.Ls).(n-1-X^j)+(\phi i.Ls+\phi o.Rs).(X^j+1)]$$
$$=(\phi i.Rs+\phi o.Ls).[Te.Wl^j+Tc.(n-1-X^j)]+(\phi i.Ls+\phi o.Rs).[Te.Wr^j+Tc.(X^j+1)]$$

16. The circuit defined in claim 15 wherein $n$ is 12, the sets $Wr^j$ and $Wl^j$ are represented in a conventional four binary digit code, and said register means includes flip-flops R(1)1, R(2)1, R(3)1, and R(4)1 producing complementary output signal pairs $R_1^1$, $\bar{R}_1^1$; $R_1^2$, $\bar{R}_1^2$; $R_1^3$, $\bar{R}_1^3$; and $R_1^4$, $\bar{R}_1^4$ and having 1 and 0 input circuit pairs $1R_1^1$, $0R_1^1$; $1R_1^2$, $0R_1^2$; $1R_1^3$, $0R_1^3$; and $1R_1^4$, $0R_1^4$, respectively; and includes flip-flops R(1)2, R(2)2, R(3)2, and R(4)2 producing complementary output signal pairs $R_2^1$, $\bar{R}_2^1$; $R_2^2$, $\bar{R}_2^2$; $R_2^3$, $\bar{R}_2^3$; and $R_2^4$, $\bar{R}_2^4$ and having 1 and 0 input circuit pairs $1R_2^1$, $0R_2^1$; $1R_2^2$, $0R_2^2$; $1R_2^3$, $0R_2^3$; and $1R_2^4$, $0R_2^4$, respectively; said first means being mechanized according to the logical equations:

$$1R_1^1=t^e.[Wl^1.(\phi i.Ls+\phi o.Rs)+Wr^1.(\phi i.Rs+\phi o.Ls)]$$
$$0R_1^1=t^r+t^c$$
$$1R_1^2=t^e.[Wl^2.(\phi i.Ls+\phi o.Rs)+Wr^2.(\phi i.Rs+\phi o.Ls)]+$$
$$\longrightarrow t^c.(Ls.\bar{R}_1^1+Rs)\longleftarrow$$
$$0R_1^2=t^r+$$
$$1R_1^3=t^e.[Wl^3.(\phi i.Ls+\phi o.Rs)+Wr^3.(\phi i.Rs+\phi o.Ls)]+t^c.Ls.R_1^4.\bar{R}_1^1$$
$$0R_1^3=t^r+t^c.Ls.\bar{R}_1^2.\bar{R}_1^1$$
$$1R_1^4=t^e.[Wl^4.(\phi i.Ls+\phi o.Rs)+Wr^4.(\phi i.Rs+\phi o.Ls)]+t^c.(Ls.\bar{R}_1^3.\bar{R}_1^2.\bar{R}_1^1+Rs.\bar{R}_1^3)$$
$$0R_1^4=t^r+t^c.(Ls.\bar{R}_1^1+Rs)$$
$$1R_2^1=t^e.[Wl^1.(\phi i.Rs+\phi o.Ls)+Wr^1.(\phi i.Ls+\phi o.Rs)]+t^c$$
$$0R_2^1=t^r+t^c$$
$$1R_2^2=t^e.[Wl^2.(\phi i.Rs+\phi o.Ls)+Wr^2.(\phi i.Ls+\phi o.Rs)]+$$
$$\longrightarrow t^c.[(\phi i.Rs+\phi o.Ls)+(\phi i.Ls+\phi o.Rs).R_2^1]\longleftarrow$$
$$0R_2^2=t^r+$$
$$1R_2^3=t^e.[Wl^3.(\phi i.Rs+\phi o.Ls)+Wr^3.(\phi i.Ls+\phi o.Rs)]+$$
$$\longrightarrow t^c.(\phi i.Ls+\phi o.Rs).R_1^2.R_1^1\longleftarrow$$
$$0R_2^3=t^r+$$
$$1R_2^4=(\phi i.Rs+\phi o.Ls).(t^e.Wl^4+t^c.\bar{R}_2^3)+(\phi i.Ls+\phi o.Rs).(t^e.Wr^4+t^c.R_2^3.R_2^2.R_2^1)$$
$$0R_2^4=t^r+t^c.(\phi i.Rs+\phi o.Ls)$$

where timing signals $t^e$ and $t^c$ initiate the entry and conversion periods T$e$ and T$c$, respectively; and signal $t^r$ is utilized to reset all flip-flops to 0 prior to the conversion period.

17. A high-speed shifting and extracting circuit operable in response to control signal $\phi i$ including an input phase of operation, control signals R$s$ and L$s$ indicating right and left shift operations, and control signal sets $Wr^j$ and $Wl^j$ indicating the amount of shift or extraction, to prepare a series of electrical input signals I representing a digital information group for a subsequent operation by simultaneously shifting and extracting a serial portion W thereof, the portion W being specified by signal sets $Wr^j$ and $Wl^j$ respectively indicating right-hand and left-hand deletions; said shifting and extracting circuit comprising: first means, responsive to signals $\phi i$, R$s$, L$s$, $Wr^j$, and $Wl^j$ for producing signals sets $R_1^j$ and $R_2^j$ indicating the amount of shift and extraction specified by the control signals, signal set $R_1^j$ being utilized also as a set of shift selection signals; second means, responsive to said signal set $R_1^j$, utilized as shift selection signals, for shifting signals I by an amount specified by the control signals to produce corresponding output signals I$s$; third means, responsive to signals sets $R_1^j$ and $R_2^j$ and to applied digit time reference signals $D^j$ for producing an extraction-indicating signal series indicating the time of occurrence of the selected portion W; and fourth means, responsive to said extraction-indicating signal series for producing an output signal series O$se$ corresponding to the shifted and selected portion W.

18. A high-speed shifting and inserting circuit operable in response to control signal $\phi o$ indicating an output phase of operation, control signals R$s$ and L$s$ indicating right and left shift operations, and control signal sets $Wr^j$ and $Wl^j$ indicating the amount of shift and insertion, to prepare a series of electrical input signals I representing a digital information group, for a subsequent operation by simultaneously shifting and inserting a serial portion W thereof, the portion W being specified by signal sets $Wr^j$ and $Wl^j$ respectively indicating right-hand and left-hand deletions; said shifting and inserting circuit comprising: first means, responsive to signals $\phi o$, R$s$, L$s$, $Wr^j$, and $Wl^j$ for producing signals sets $R_1^j$ and $R_2^j$ indicating the amount of shift and insertion specified by the control signals, signal set $R_1^j$ being utilized also as a set of shift selection signals; second means responsive to said signal set $R_1^j$ utilized as shift selection signals, for shifting signals I by an amount specified by the control signals to produce corresponding output signals I$s$; third means, responsive to signal sets $R_1^j$ and $R_2^j$ and to applied digit time reference signals $D^j$ for producing an insertion-indicating signal series indicating the time of occurrence of the selected portion W; and fourth means, responsive to said insertion-indicating signal series for producing an output signal series O$si$ corresponding to the shifted and selected portion W.

19. In an electronic business data handling system, wherein input information, represented by a corresponding series of electrical input signals I, must be rapidly prepared for subsequent operation or for insertion into an output information group; a high-speed shifting, extracting, and inserting circuit operable; in response to control signals $\phi i$ and $\phi o$ respectively indicating input and output phases of operation, control signals R$s$ and L$s$ respectively indicating right and left shift directions, and control signal sets $Wr^j$ and $Wl^j$ respectively indicating right-hand and left-hand portions of signal series I adjacent to a series W to be selected; to prepare, during input phases, signals I for a subsequent operation by simultaneously shifting and extracting the series portion W; or to prepare, during output phases, the selected series W for entry into the output information group; said shifting, extracting, and inserting circuit comprising: matrix conversion means, responsive to signals $\phi i$, $\phi o$, R$s$, L$s$, $Wr^j$, and $Wl^j$ for producing signal sets $R_1^j$ and $R_2^j$ indicating the amount of shift and extraction or the amount of shift and insertion specified by the control signals, signal set $R_1^j$ being utilized also as shift control signals; shifting means, responsive to signal set $R_1^j$, for shifting signals I by an amount specified by the control signals to produce corresponding output signals I$s$; comparison means, responsive to signal sets $R_1^j$ and $R_2^j$ and to applied timing signal sets $D^j$ for producing comparison signal series $Co^1$ and $Co^2$ indicating the time of occurrence of the selected portion W; extraction means, coupled to said shifting means and responsive to signals $Co^1$ and $Co^2$ for producing an output signal series O$se$ corresponding to the shifted and selected portion W; and insertion means, responsive to signals I$s$ and to signals $Co^1$ and $Co^2$ for producing an output signal series O$si$ corresponding to the selected portion W to be inserted.

20. A shift-extract-insert circuit disposed electrically for coupling to a memory and to an arithmetic unit in a computer for transferring operands and resultants between the memory and the arithmetic unit, said shift-extract-insert circuit being operable to receive an applied signal series representing a word, and to simultaneously select a portion thereof and shift said selected portion either toward the positions of increased digital significance in the word or toward the positions of decreased digital significance in the word, said shift-extract-insert circuit comprising: static storage means for receiving and storing control signals indicating both the portion of the signal series to be selected and the amount of shift desired; a digit counter for generating a set of count signals cyclically indicating successive digit time intervals, each cycle corresponding to the fixed word length; a delay device having a delay which is variable in discrete increments, each increment corresponding to one digit, up to and including the fixed word length; input circuit means coupled to said delay device for applying the signal series thereto; first logical circuit means connected to said static storage means and to said delay device and responsive to said control signals for selecting an amount of delay corresponding to the amount of shift desired; output circuit means coupled to said delay device for receiving a delayed signal series therefrom; and second logical circuit means coupled to said digit counter and to said static storage means and responsive to said set of count signals and to said control signals for generating selection signal series indicating the selected and non-selected portions of the applied signal series, said second logical circuit means being coupled to said input circuit means and to said output circuit means, said input circuit means and said output circuit means being responsive to said selection signals for rejecting all of the applied signal series except said selected portion, whereby said selected portion of the applied signal series is generated by said output circuit means after a time delay corresponding to the amount of shift desired.

21. In combination for use with means for providing pluralities of signals representing digital information grouped into words having particular numbers of digital positions and for sequentially presenting the signals for use, matrix means for receiving signals controlling the particular usage of the information signals, the shift of the signals in a leading or lagging direction and particular boundaries in the word and for operating upon the control signals to produce matrix signals, an input extracting circuit controlled by the matrix signals and responsive to the information signals for passing particular portions of each word, a shifting circuit controlled by the matrix signals and responsive to the signals passed by the input circuit for delaying the signals passing through the input extracting circuits by a number of digital positions dependent upon the particular boundaries in the word, and output circuitry controlled by the matrix signals and responsive to the signals from the shifting circuit for passing the signals from the shifting circuit only in a number of digital positions dependent upon the boundaries in the word.

22. In combination for use with means for providing pluralities of signals representing digital information grouped into words having particular numbers of digital positions and for sequentially presenting the signals for use, matrix means for receiving signals controlling the shift of the information in the word in a leading or lagging direction and defining boundaries at the beginning and end of the word and for operating upon these signals to produce matrix signals, means for providing a count of the number of digital positions sequentially presented in the word at any instant, means responsive to the matrix signals and to the counting signals to produce comparison signals for each digital position, an input extracting circuit responsive to the control and comparison signals for operating upon the information signals in accordance with the comparison and control signals to pass signals only in particular positions of the word dependent upon the boundaries of the word, a shifting circuit responsive to the signals from the matrix means and the input extracting circuit for operating upon the signals from the input extracting circuit in accordance with the matrix signals to delay the signals by a number of positions dependent upon the boundaries of the word, and a circuit responsive to the control signals and to the signals from the shifting circuit and the comparison means for operating upon the signals from the shifting circuit in accordance with the comparison and control signals to pass the signals only in particular positions dependent upon the boundaries of the word.

23. In combination for use with means for providing pluralities of signals representing digital information grouped into words having particular numbers of digital positions and for sequentially presenting the signals for use, matrix means for receiving signals representing various parameters controlling the usage of the information signals either as input information or as output information and controlling the shift of the signals in either a leading or a lagging direction from the standpoint of signal presentation and controlling the first and last portions of the word in definition of the particular portion of the word to be shifted and for operating upon these control signals to provide matrix signals, means responsive to the matrix signals in successive positions of the word for operating upon the matrix signals to provide comparison signals in each digital position of the word, an input circuit responsive to the comparison signals and the signals controlling usage for extracting particular portions of the word in accordance with the comparison signals and the control signals controlling the direction of shift during usages of the signals as input information, a shifting circuit responsive to the matrix signals and the signals from the input circuit for shifting the signals passed by the input circuit in accordance with the matrix signals and the signals controlling usage, an extracting circuit responsive to the comparison signals and the signals from the shifting circuit and the signals controlling usage for passing the signals from the shifting circuit in accordance with the comparison signals and the signals controlling usage as input information and shift in either a leading or lagging direction, and an inserting circuit responsive to the comparison signals and the signals from the shifting circuit and the signals controlling usage for passing the signals from the shifting circuit in accordance with the comparison signals and the signals controlling usage as output information and shift in either a leading or lagging direction.

References Cited in the file of this patent

UNITED STATES PATENTS

| | | |
|---|---|---|
| 2,634,052 | Bloch | Apr. 7, 1953 |
| 2,700,502 | Hamilton et al. | Jan. 25, 1955 |
| 2,700,503 | Crosman | Jan. 25, 1955 |
| 2,770,797 | Hamilton et al. | Nov. 13, 1956 |
| 2,775,402 | Weiss | Dec. 25, 1956 |
| 2,792,987 | Stibitz | May 21, 1957 |

OTHER REFERENCES

A Functional Description of the EDVAC, vol. I, Univ. of Penna., Moore School of Elec. Eng., Phila., Pa., November 1949, pages 2–41 to 2–59.

UNITED STATES PATENT OFFICE

Certificate of Correction

Patent No. 2,930,028 March 22, 1960

Robert Royce Johnson et al.

It is hereby certified that error appears in the printed specification of the above numbered patent requiring correction and that the said Letters Patent should read as corrected below.

Column 6, line 56, for "$0 \leqq t \leqq Wl^j$" read —$0 \leqq t \leqq Wr^j$ of the first word time, and the portion $Wl^j$ may be deleted in output extracting circuit 300 during the time interval $0 \leqq t \leqq Wl^j$—; column 9, line 7, for "$Co$" read —$Co^2$—; column 15, line 20, for "700-2 would be controlled by the $R_2^1$, $R_2^2$, $R_2^3$ and $R_2^4$" read —700-1 would be controlled by the $R_1^1$, $R_1^2$, $R_1^3$ and $R_1^4$—; column 27, line 25, the logical expression should appear as shown below instead of as in the patent:

$$Ie = I.\phi i.[Ls.(t \geqq Wr^j) + Rs.(t \leqq n - Wl^j)]$$

same column 27, line 34, the logical expression should appear as shown below instead of as in the patent:

$$Ose = Ise.\phi i.[Ls.(t \geqq Wl^j) + Rs.(t \leqq n - Wr^j)]$$

same column 27, line 38, the logical expression should appear as shown below instead of as in the patent:

$$Osi = Is.\phi o.[(t \geqq Wr^j).(t \leqq n - Wl^j)]$$

column 29, line 56, for "including" read —indicating—.

Signed and sealed this 20th day of December 1960.

[SEAL]

Attest:

KARL H. AXLINE, *Attesting Officer.*

ROBERT C. WATSON, *Commissioner of Patents.*